US012771676B2

(12) United States Patent
Osborn et al.

(10) Patent No.: US 12,771,676 B2
(45) Date of Patent: *Oct. 20, 2026

(54) SYSTEMS AND METHODS FOR CRYPTOGRAPHIC AUTHENTICATION OF CONTACTLESS CARDS

(71) Applicant: Capital One Services, LLC, McLean, VA (US)

(72) Inventors: Kevin Osborn, Newton Highlands, MA (US); James Ashfield, Midlothian, VA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,880

(22) Filed: Feb. 23, 2024

(65) Prior Publication Data

US 2024/0356905 A1 Oct. 24, 2024

Related U.S. Application Data

(63) Continuation of application No. 17/678,969, filed on Feb. 23, 2022, now Pat. No. 11,924,188, which is a (Continued)

(51) Int. Cl.
*H04L 9/40* (2022.01)

(52) U.S. Cl.
CPC .............. *H04L 63/08* (2013.01); *H04L 63/14* (2013.01)

(58) Field of Classification Search
CPC ................................ H04L 63/08; H04L 63/14
See application file for complete search history.

(56) References Cited

U.S. PATENT DOCUMENTS 5,590,038 A 12/1996 Pitroda
5,666,415 A 9/1997 Kaufman (Continued)

FOREIGN PATENT DOCUMENTS

CN 101192295 A 6/2008
EP 3343488 A1 7/2018

(Continued)

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

(Continued)

*Primary Examiner* — Oleg Korsak
(74) *Attorney, Agent, or Firm* — KDW Firm PLLC; Andrew D. Kasnevich

(57) ABSTRACT

Example embodiments of systems and methods for data transmission between a contactless card, a client device, and one or more servers are provided. The memory of the contactless card may include one or more applets and a counter. The client device may be in data communication with the contactless card and one or more servers, and the one or more servers may include an expected counter value. The client device may be configured to read the counter from the contactless card and transmit it to the one or more servers. The one or more servers may compare the counter to the expected counter value for synchronization. The contactless card and the one or more servers may resynchronize the counter, via one or more processes, based on one or more reads of the one or more applets. The one or more servers may authenticate the contactless card based on the resynchronization.

20 Claims, 16 Drawing Sheets

100

Related U.S. Application Data continuation of application No. 16/791,551, filed on Feb. 14, 2020, now Pat. No. 11,297,046, which is a continuation of application No. 16/589,192, filed on Oct. 1, 2019, now Pat. No. 10,623,393, which is a continuation-in-part of application No. 16/205,119, filed on Nov. 29, 2018, now Pat. No. 10,581,611.

(60) Provisional application No. 62/740,352, filed on Oct. 2, 2018.

(56) References Cited

U.S. PATENT DOCUMENTS

| | | | | |
|---|---|---|---|---|
| 6,199,114 | B1 | 3/2001 | White | |
| 6,324,271 | B1 | 11/2001 | Sawyer | |
| 6,367,011 | B1 | 4/2002 | Lee | |
| 6,572,015 | B1 | 6/2003 | Norton | |
| 7,252,242 | B2 | 8/2007 | Ho | |
| 7,270,276 | B2 | 9/2007 | Vayssiere | |
| 7,287,692 | B1 | 10/2007 | Patel | |
| 7,374,099 | B2 | 5/2008 | de Jong | |
| 7,527,208 | B2 | 5/2009 | Hammad | |
| 7,568,631 | B2 | 8/2009 | Gibbs | |
| 7,584,153 | B2 | 9/2009 | Brown | |
| 7,628,322 | B2 | 12/2009 | Holtmanns | |
| 7,793,851 | B2 | 9/2010 | Mullen | |
| 7,801,799 | B1 | 9/2010 | Brake, Jr. | |
| 7,908,216 | B1 | 3/2011 | Davis | |
| 7,922,082 | B2 | 4/2011 | Muscato | |
| 8,010,405 | B1 | 8/2011 | Bortolin | |
| 8,074,877 | B2 | 12/2011 | Mullen | |
| 8,082,450 | B2 | 12/2011 | Frey | |
| 8,108,687 | B2 | 1/2012 | Ellis | |
| 8,186,602 | B2 | 5/2012 | Itay | |
| 8,196,131 | B1 | 6/2012 | von Behren | |
| 8,249,654 | B1 | 8/2012 | Zhu | |
| 8,276,814 | B1 | 10/2012 | Davis | |
| 8,332,272 | B2 | 12/2012 | Fisher | |
| 8,346,670 | B2 | 1/2013 | Hasson | |
| 8,511,547 | B2 | 8/2013 | Rans | |
| 8,519,822 | B2 | 8/2013 | Riegebauer | |
| 8,750,514 | B2 | 6/2014 | Gallo | |
| 8,870,081 | B2 | 10/2014 | Olson | |
| 9,038,893 | B2 | 5/2015 | Kirkham | |
| 9,129,199 | B2 | 9/2015 | Spodak | |
| 9,183,490 | B2 | 11/2015 | Moreton | |
| 9,275,325 | B2 | 3/2016 | Newcombe | |
| 9,286,606 | B2 | 3/2016 | Diamond | |
| 9,306,753 | B1 | 4/2016 | Vandervort | |
| 9,501,776 | B2 | 11/2016 | Martin | |
| 9,710,744 | B2 | 7/2017 | Wurmfeld | |
| 9,949,065 | B1 | 4/2018 | Zarakas | |
| 9,965,632 | B2 | 5/2018 | Zarakas | |
| 9,965,911 | B2 | 5/2018 | Wishne | |
| 9,977,890 | B2 | 5/2018 | Alberti | |
| 9,978,056 | B2 | 5/2018 | Seo | |
| 9,978,058 | B2 | 5/2018 | Wurmfeld | |
| 9,990,795 | B2 | 6/2018 | Wurmfeld | |
| 10,007,873 | B2 | 6/2018 | Heo | |
| 10,013,693 | B2 | 7/2018 | Wyatt | |
| 10,121,130 | B2 | 11/2018 | Pinski | |
| 10,210,505 | B2 | 2/2019 | Zarakas | |
| 10,242,368 | B1 | 3/2019 | Poole | |
| 10,296,910 | B1 | 5/2019 | Templeton | |
| 10,332,102 | B2 | 6/2019 | Zarakas | |
| 10,360,557 | B2 | 7/2019 | Locke | |
| 10,380,471 | B2 | 8/2019 | Locke | |
| 10,395,244 | B1 | 8/2019 | Mossler | |
| 10,453,054 | B2 | 10/2019 | Zarakas | |
| 10,474,941 | B2 | 11/2019 | Wurmfeld | |
| 10,475,027 | B2 | 11/2019 | Guise | |
| 10,482,453 | B2 | 11/2019 | Zarakas | |
| 10,482,457 | B2 | 11/2019 | Poole | |
| 10,489,774 | B2 | 11/2019 | Zarakas | |
| 10,489,781 | B1 | 11/2019 | Osborn | |
| 10,510,070 | B2 | 12/2019 | Wurmfeld | |
| 10,515,361 | B2 | 12/2019 | Zarakas | |
| 10,535,068 | B2 | 1/2020 | Locke | |
| 10,546,444 | B2 | 1/2020 | Osborn | |
| 10,581,611 | B1 | 3/2020 | Osborn | |
| 10,664,830 | B1 | 5/2020 | Rule | |
| 10,685,349 | B2 | 6/2020 | Brickell | |
| 10,797,882 | B2 | 10/2020 | Rule | |
| 10,880,741 | B2 | 12/2020 | Zarakas | |
| 10,909,525 | B1 | 2/2021 | Dhodapkar | |
| 10,970,691 | B2 | 4/2021 | Koeppel | |
| 10,984,416 | B2 | 4/2021 | Ilincic | |
| 11,037,136 | B2 | 6/2021 | Rule | |
| 11,062,098 | B1 | 7/2021 | Bergeron | |
| 11,120,453 | B2 | 9/2021 | Rule | |
| 11,138,593 | B1 | 10/2021 | Ho | |
| 11,138,605 | B2 | 10/2021 | Aabye | |
| 11,176,540 | B2 | 11/2021 | Gupta | |
| 11,188,908 | B2 | 11/2021 | Locke | |
| 11,216,806 | B2 | 1/2022 | Mossler | |
| 11,297,958 | B2 | 4/2022 | Vukich | |
| 11,334,872 | B2 | 5/2022 | Phillips | |
| 11,361,173 | B2 | 6/2022 | Edwards | |
| 11,392,933 | B2 | 7/2022 | Mossler | |
| 11,392,935 | B2 | 7/2022 | Suresh | |
| 11,416,844 | B1 | 8/2022 | Osterkamp | |
| 11,423,392 | B1 | 8/2022 | Ho | |
| 11,443,292 | B2 | 9/2022 | Sherif | |
| 11,444,770 | B2 | 9/2022 | Wieker | |
| 11,461,764 | B2 | 10/2022 | Rule | |
| 11,481,764 | B2 | 10/2022 | Shakkarwar | |
| 11,521,213 | B2 | 12/2022 | Rule | |
| 11,551,200 | B1 | 1/2023 | Cook | |
| 11,556,918 | B2 | 1/2023 | Mestre | |
| 11,615,395 | B2 | 3/2023 | McHugh | |
| 11,777,933 | B2 | 10/2023 | Moreton | |
| 11,924,188 | B2 * | 3/2024 | Osborn | H04L 9/0897 |
| 2003/0220876 | A1 | 11/2003 | Burger | |
| 2005/0156026 | A1 | 7/2005 | Ghosh | |
| 2005/0228997 | A1 | 10/2005 | Bicker | |
| 2005/0269402 | A1 | 12/2005 | Spitzer | |
| 2007/0276765 | A1 | 11/2007 | Hazel | |
| 2008/0082452 | A1 | 4/2008 | Wankmueller | |
| 2008/0099552 | A1 | 5/2008 | Grillion | |
| 2009/0143104 | A1 | 6/2009 | Loh | |
| 2009/0235339 | A1 | 9/2009 | Mennes | |
| 2009/0282264 | A1 | 11/2009 | Amiel | |
| 2011/0113245 | A1 | 5/2011 | Varadarajan | |
| 2011/0155801 | A1 | 6/2011 | Rowberry | |
| 2012/0143703 | A1 | 6/2012 | Wall | |
| 2013/0030997 | A1 | 1/2013 | Spodak | |
| 2013/0146657 | A1 | 6/2013 | Graef | |
| 2013/0211937 | A1 | 8/2013 | Elbirt | |
| 2013/0226797 | A1 | 8/2013 | Jiang et al. | |
| 2013/0311363 | A1 | 11/2013 | Ramaci | |
| 2014/0074637 | A1 | 3/2014 | Hammad | |
| 2014/0074655 | A1 | 3/2014 | Lim | |
| 2014/0081785 | A1 | 3/2014 | Valadas Preto | |
| 2014/0365377 | A1 | 12/2014 | Salama | |
| 2015/0032635 | A1 | 1/2015 | Guise | |
| 2015/0073983 | A1 | 3/2015 | Bartenstein | |
| 2015/0113271 | A1 | 4/2015 | Jooste | |
| 2015/0134513 | A1 | 5/2015 | Olson | |
| 2015/0199673 | A1 | 7/2015 | Savolainen | |
| 2015/0199863 | A1 | 7/2015 | Scoggins | |
| 2015/0254637 | A1 | 9/2015 | Yang | |
| 2015/0317295 | A1 | 11/2015 | Sherry | |
| 2016/0012432 | A1 | 1/2016 | Meshkati et al. | |
| 2016/0078430 | A1 | 3/2016 | Douglas | |
| 2016/0189143 | A1 | 6/2016 | Koeppel | |
| 2016/0253651 | A1 | 9/2016 | Park | |
| 2016/0277383 | A1 | 9/2016 | Guyomarc'h | |
| 2016/0307189 | A1 | 10/2016 | Zarakas | |
| 2016/0314472 | A1 | 10/2016 | Ashfield | |
| 2016/0379217 | A1 | 12/2016 | Hammad | |
| 2017/0017957 | A1 | 1/2017 | Radu | |
| 2017/0039566 | A1 | 2/2017 | Schipperheijn | |
| 2017/0068950 | A1 | 3/2017 | Kwon | |
| 2017/0330173 | A1 | 11/2017 | Woo | |

(56) References Cited

U.S. PATENT DOCUMENTS

| | | | |
|---|---|---|---|
| 2018/0039987 | A1 | 2/2018 | Molino |
| 2018/0068105 | A1 | 3/2018 | Shapiro et al. |
| 2018/0204212 | A1 | 7/2018 | Collinge et al. |
| 2018/0268132 | A1 | 9/2018 | Buer |
| 2018/0300716 | A1 | 10/2018 | Carlson |
| 2019/0172055 | A1 | 6/2019 | Hale |
| 2019/0303945 | A1 | 10/2019 | Mitra |
| 2021/0004806 | A1 | 1/2021 | Noe |
| 2021/0272098 | A1 | 9/2021 | Delsuc |
| 2021/0304189 | A1 | 9/2021 | Gupta |
| 2021/0383360 | A1 | 12/2021 | Sinha |
| 2021/0406869 | A1 | 12/2021 | Pathrabe |
| 2022/0114581 | A1 | 4/2022 | Upadhye |
| 2022/0284416 | A1 | 9/2022 | Rule |
| 2022/0309509 | A1 | 9/2022 | Akgun |
| 2022/0335412 | A1 | 10/2022 | Rule |
| 2022/0366410 | A1 | 11/2022 | Rule |
| 2022/0398566 | A1 | 12/2022 | Rule |
| 2022/0414648 | A1 | 12/2022 | Rule |
| 2023/0054157 | A1 | 2/2023 | Mao |
| 2023/0065163 | A1 | 3/2023 | Vargas |
| 2023/0083785 | A1 | 3/2023 | Maiman |
| 2023/0169505 | A1 | 6/2023 | Rule |
| 2023/0354020 | A1 | 11/2023 | Rule |
| 2023/0359839 | A1 | 11/2023 | Lovgren |

FOREIGN PATENT DOCUMENTS

| | | | |
|---|---|---|---|
| GB | 2516861 | A | 2/2015 |
| GB | 2551907 | A | 1/2018 |
| JP | H0268693 | A | 3/1990 |
| JP | 2008234096 | A | 10/2008 |
| KR | 20150140132 | A | 12/2015 |
| KR | 2017-0111524 | A | 10/2017 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

EMVCo, LLC, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

EMVCo, LLC, "EMV Card Personalisation Specification," Aug. 1, 2021, retrieved from Internet URL: https://www.emvco.com/specification/?post_id=12467, 114 pages.

EMVCo, LLC, "EMV Card Personalization Specification," Version 1.0 (2003), 81 pages.

EMVCo, LLC, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_2016080902325 . . . , 52 pages.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMACpdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and No Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

200

400

600

00 D1 (Message Begin, Message End, Short Record, noID length) 01 (well known type) 01 01 Text type
02 <Payload Length including recordID and "EN", or contentlength+3) = 45+3 = 48 (DEC)
03 54 ('T')
04 02 record ID
05 65 6E (language length, 'en')
07 43 01 00 76 a6 62 7b 67 a8 cf bb <eight mac bytes>
D101305402656E 43010076A6627B67A8CFBB <eight mac bytes>

710

| VERSION | pUID (8) | pATC | ENCYPHERED CRYPTOGRAM(16) | |
|---|---|---|---|---|
| 0100 | 0015399555360061 | 00000050 | 7D28B8B9D8666E5143153AC9C944E5A6 | |
| | | | | |
| | | | | |
| DECRYPTED CRYPTOGRAM | | | | |
| RANDOM (8) | MAC (8) | | | |
| 4838FB7DC171B89E | CF3F3B8C56DA0BF1 | | | |
| | | | | |
| | MAC(T=[pVERSION (2 BYTES) \| \| pUID (8 BYTES) \| \| pATC (4 BYTES) \| \| pSHSEC (4 BYTES) \| \| '80' \| \| '00 00 00 00 00']) | | | |

720

*FIG. 7*

SYSTEMS AND METHODS FOR CRYPTOGRAPHIC AUTHENTICATION OF CONTACTLESS CARDS

CROSS-REFERENCE TO RELATED APPLICATIONS

This application is a continuation of U.S. patent application Ser. No. 17/678,969, filed on Feb. 23, 2022, which is a continuation of U.S. patent application Ser. No. 16/791,551, filed on Feb. 14, 2020, which is a continuation of U.S. patent application Ser. No. 16/589,192, filed on Oct. 1, 2019, which is a continuation-in-part of U.S. patent application Ser. No. 16/205,119, filed on Nov. 29, 2018, and claims priority from U.S. Provisional Patent Application No. 62/740,352, filed on Oct. 2, 2018, the disclosures of which are incorporated herein by reference in their entireties.

FIELD OF THE INVENTION

The present disclosure relates to cryptography, and more particularly, to systems and methods for the cryptographic authentication of contactless cards.

BACKGROUND

Data security and transaction integrity are of critical importance to businesses and consumers. This need continues to grow as electronic transactions constitute an increasingly large share of commercial activity.

Email may be used as a tool to verify transactions, but email is susceptible to attack and vulnerable to hacking or other unauthorized access. Short message service (SMS) messages may also be used, but that is subject to compromise as well. Moreover, even data encryption algorithms, such as triple DES algorithms, have similar vulnerabilities.

Activating many cards, including for example financial cards (e.g., credit cards and other payment cards), involves the time-consuming process of cardholders calling a telephone number or visiting a website and entering or otherwise providing card information. Further, while the growing use of chip-based financial cards provides more secure features over the previous technology (e.g., magnetic strip cards) for in-person purchases, account access still may rely on log-in credentials (e.g., username and password) to confirm a cardholder's identity. However, if the log-in credentials are compromised, another person could have access to the user's account.

These and other deficiencies exist. Accordingly, there is a need to provide users with an appropriate solution that overcomes these deficiencies to provide data security, authentication, and verification for contactless cards. Further, there is a need for both an improved method of activating a card and an improved authentication for account access.

SUMMARY

Aspects of the disclosed technology include systems and methods for cryptographic authentication of contactless cards. Various embodiments describe systems and methods for implementing and managing cryptographic authentication of contactless cards.

Embodiments of the present disclosure provide a counter resynchronization system comprising: a contactless card including one or more processors, and a memory, wherein the memory comprises one or more applets and a counter; a client application comprising instructions for execution on a client device including one or more processors and a memory; and one or more servers in data communication with the client application, the one or more servers including a memory comprising an expected counter value, wherein the client application is configured to read the counter from the contactless card and transmit the counter to the one or more servers, wherein the one or more servers are configured to compare the counter to the expected counter value for synchronization; wherein the contactless card and the one or more servers are configured to resynchronize the counter, via one or more processes, based on one or more reads of the one or more applets, and wherein the one or more servers are configured to authenticate the contactless card based on the resynchronization.

Embodiments of the present disclosure provide a method of resynchronizing a counter in a contactless card comprising: communicating, by a contactless card, to a client application comprising instructions for execution on a client device, the client application also in communication with one or more servers, the contactless card including one or more processors, and a memory, wherein the memory comprises one or more applets and a first counter; comparing, by the one or more servers, the counter received from the client application to an expected counter value for synchronization; resynchronizing the counter, via one or more resynchronization processes, based on one or more reads of the one or more applets; and authenticating, by the one or more servers, the contactless card based on resynchronizing the counter.

Embodiments of the present disclosure provide a contactless card comprising: one or more processors, and a memory, wherein the memory comprises one or more applets and a counter; wherein the counter is resynchronized, via a resynchronization process, based on one or more reads of the one or more applets, wherein the resynchronization process includes: performing, by a client application comprising instructions for execution on a client device, the one or more reads of the one or more applets during a single gesture by the contactless card, and receiving, by the one or more servers, the one or more reads from the client application based on the single gesture, and resynchronizing the counter, by the contactless card, wherein the single gesture comprises a wave, tap, or swipe or any combination thereof by the contactless card to the client application, and wherein the resynchronization process includes a first window and is configured to determine if an increment of the counter belongs to a first non-monotonic sequence within the first window Further features of the disclosed design, and the advantages offered thereby, are explained in greater detail hereinafter with reference to specific example embodiments illustrated in the accompanying drawings.

BRIEF DESCRIPTION OF THE DRAWINGS

FIG. 7 is an illustration depicting a message and a message format according to an example embodiment.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

An objective of some embodiments of the present disclosure is to build one or more keys into one or more contactless cards. In these embodiments, the contactless card can perform authentication and numerous other functions that may otherwise require the user to carry a separate physical token in addition to the contactless card. By employing a contactless interface, contactless cards may be provided with a method to interact and communicate between a user's device (such as a mobile phone) and the card itself. For example, the EMV protocol, which underlies many credit card transactions, includes an authentication process which suffices for operating systems for Android® but presents challenges for iOS®, which is more restrictive regarding near field communication (NFC) usage, as it can be used only in a read-only manner. Exemplary embodiments of the contactless cards described herein utilize NFC technology.

Figure 1A:
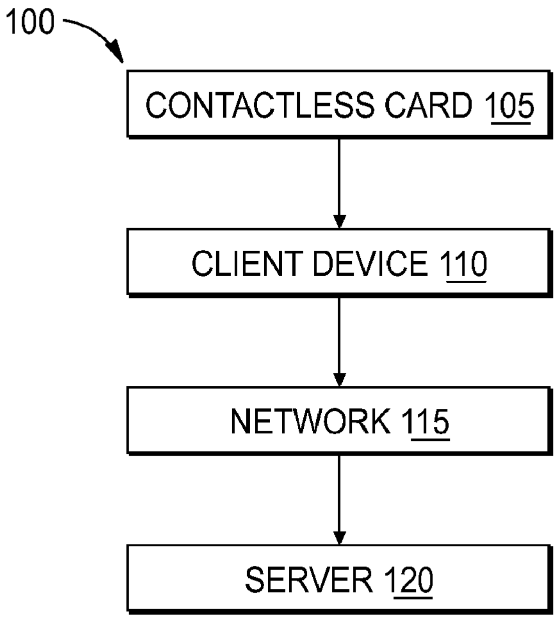
FIG. 1A is a diagram of a data transmission system according to an example embodiment.

FIG. 1A illustrates a data transmission system according to an example embodiment. As further discussed below, system 100 may include contactless card 105, client device 110, network 115, and server 120. Although FIG. 1A illustrates single instances of the components, system 100 may include any number of components.

System 100 may include one or more contactless cards 105, which are further explained below with reference to FIGS. 5A-5B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 110 device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115, and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network, and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
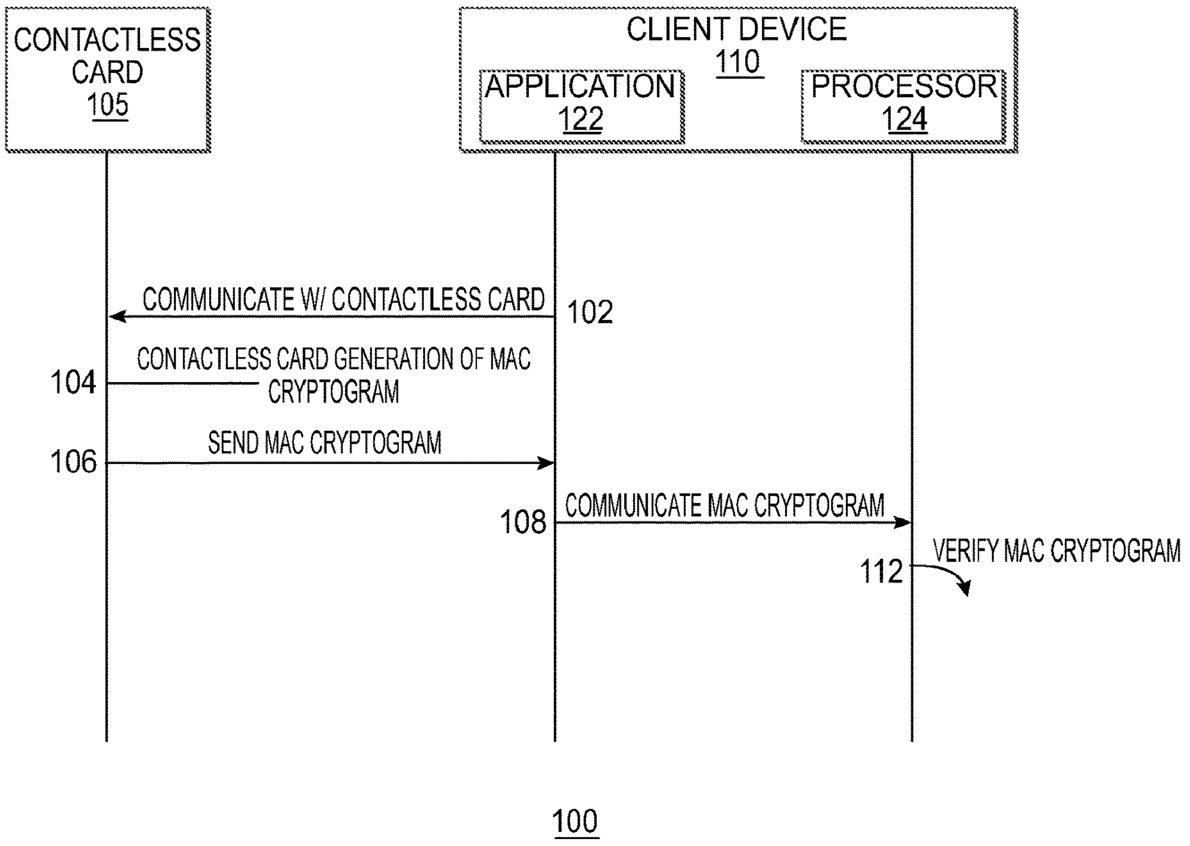
FIG. 1B is a diagram illustrating a sequence for providing authenticated access according to an example embodiment.

FIG. 1B is a timing diagram illustrating an example sequence for providing authenticated access according to one or more embodiments of the present disclosure. System 100 may comprise contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format. For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124.

At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 2:
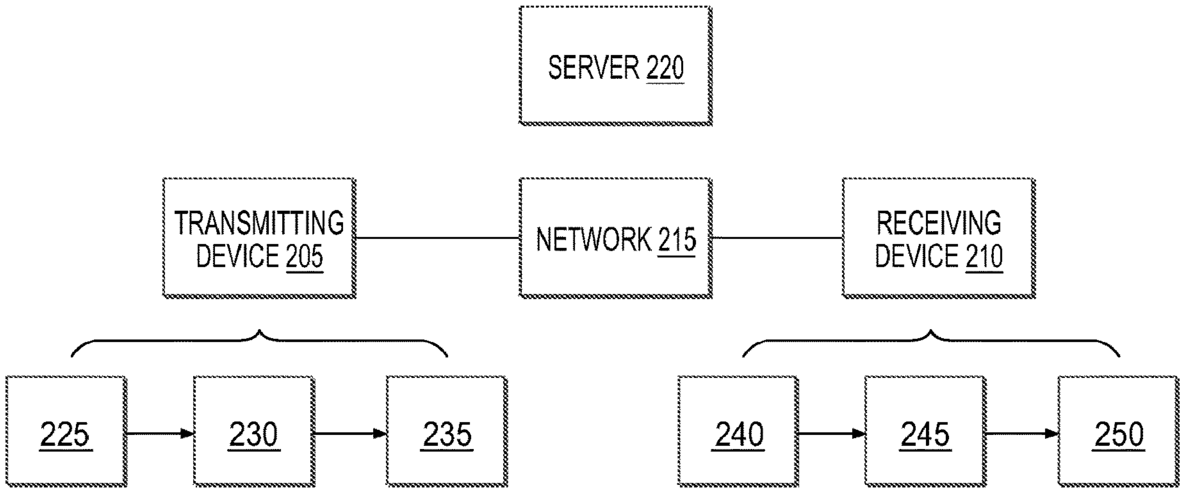
FIG. 2 is a diagram of a data transmission system according to an example embodiment.

FIG. 2 illustrates a data transmission system according to an example embodiment. System 200 may include a transmitting or sending device 205, a receiving or recipient device 210 in communication, for example via network 215, with one or more servers 220. Transmitting or sending device 205 may be the same as, or similar to, client device 110 discussed above with reference to FIG. 1A. Receiving or recipient device 210 may be the same as, or similar to, client device 110 discussed above with reference to FIG. 1A. Network 215 may be similar to network 115 discussed above with reference to FIG. 1A. Server 220 may be similar to server 120 discussed above with reference to FIG. 1A. Although FIG. 2 shows single instances of components of system 200, system 200 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduce exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring back to FIG. 2, system 200 may be configured to implement key diversification. For example, a sender and recipient may desire to exchange data (e.g., original sensitive data) via respective devices 205 and 210. As explained above, although single instances of transmitting device 205 and receiving device 210 may be included, it is understood that one or more transmitting devices 205 and one or more receiving devices 210 may be involved so long as each party shares the same shared secret symmetric key. In some examples, the transmitting device 205 and receiving device 210 may be provisioned with the same master symmetric key. Further, it is understood that any party or device holding the same secret symmetric key may perform the functions of the transmitting device 205 and similarly any party holding the same secret symmetric key may perform the functions of the receiving device 210. In some examples, the symmetric key may comprise the shared secret symmetric key which is kept secret from all parties other than the transmitting device 205 and the receiving device 210 involved in exchanging the secure data. It is further understood that both the transmitting device 205 and receiving device 210 may be provided with the same master symmetric key, and further that part of the data exchanged between the transmitting device 205 and receiving device 210 comprises at least a portion of data which may be referred to as the counter value. The counter value may comprise a number that changes each time data is exchanged between the transmitting device 205 and the receiving device 210.

System 200 may include one or more networks 215. In some examples, network 215 may be one or more of a wireless network, a wired network or any combination of wireless network and wired network, and may be configured to connect one or more transmitting devices 205 and one or more receiving devices 210 to server 220. For example, network 215 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or the like.

In addition, network 215 may include, without limitation, telephone lines, fiber optics, IEEE Ethernet 902.3, a wide area network, a wireless personal area network, a LAN, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may comprise a plurality of interconnected networks, such as, for example, the Internet, a service provider's network, a cable television network, corporate networks, such as credit card association networks, and home networks.

In some examples, one or more transmitting devices 205 and one or more receiving devices 210 may be configured to communicate and transmit and receive data between each other without passing through network 215. For example, communication between the one or more transmitting devices 205 and the one or more receiving devices 210 may occur via at least one of NFC, Bluetooth, RFID, Wi-Fi, and/or the like.

At block 225, when the transmitting device 205 is preparing to process the sensitive data with symmetric cryptographic operation, the sender may update a counter. In addition, the transmitting device 205 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 230, the transmitting device 205 may take the selected cryptographic algorithm, and using the master symmetric key, process the counter value. For example, the sender may select a symmetric encryption algorithm, and use a counter which updates with every conversation between the transmitting device 205 and the receiving device 210. The transmitting device 205 may then encrypt the counter value with the selected symmetric encryption algorithm using the master symmetric key, creating a diversified symmetric key.

In some examples, the counter value may not be encrypted. In these examples, the counter value may be transmitted between the transmitting device 205 and the receiving device 210 at block 230 without encryption.

At block 235, the diversified symmetric key may be used to process the sensitive data before transmitting the result to the receiving device 210. For example, the transmitting device 205 may encrypt the sensitive data using a symmetric encryption algorithm using the diversified symmetric key, with the output comprising the protected encrypted data. The transmitting device 205 may then transmit the protected encrypted data, along with the counter value, to the receiving device 210 for processing.

At block 240, the receiving device 210 may first take the counter value and then perform the same symmetric encryption using the counter value as input to the encryption, and the master symmetric key as the key for the encryption. The output of the encryption may be the same diversified symmetric key value that was created by the sender.

At block 245, the receiving device 210 may then take the protected encrypted data and using a symmetric decryption algorithm along with the diversified symmetric key, decrypt the protected encrypted data.

At block 250, as a result of the decrypting the protected encrypted data, the original sensitive data may be revealed.

The next time sensitive data needs to be sent from the sender to the recipient via respective transmitting device 205 and receiving device 210, a different counter value may be selected producing a different diversified symmetric key. By processing the counter value with the master symmetric key and same symmetric cryptographic algorithm, both the transmitting device 205 and receiving device 210 may independently produce the same diversified symmetric key. This diversified symmetric key, not the master symmetric key, is used to protect the sensitive data.

As explained above, both the transmitting device 205 and receiving device 210 each initially possess the shared master symmetric key. The shared master symmetric key is not used to encrypt the original sensitive data. Because the diversified symmetric key is independently created by both the transmitting device 205 and receiving device 210, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 205 and the receiving device 210 may be governed by symmetric requirements for how often to create a new diversification value, and therefore a new diversified symmetric key. In an embodiment, a new diversification value and therefore a new diversified symmetric key may be created for every exchange between the transmitting device 205 and receiving device 210.

In some examples, the key diversification value may comprise the counter value. Other non-limiting examples of the key diversification value include: a random nonce generated each time a new diversified key is needed, the random nonce sent from the transmitting device 205 to the receiving device 210; the full value of a counter value sent from the transmitting device 205 and the receiving device 210; a portion of a counter value sent from the transmitting device 205 and the receiving device 210; a counter independently maintained by the transmitting device 205 and the receiving device 210 but not sent between the two devices; a one-time-passcode exchanged between the transmitting device 205 and the receiving device 210; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 205 and the receiving device 210. In effect, this may create a one-time use key, such as a single-use session key.

Figure 3:
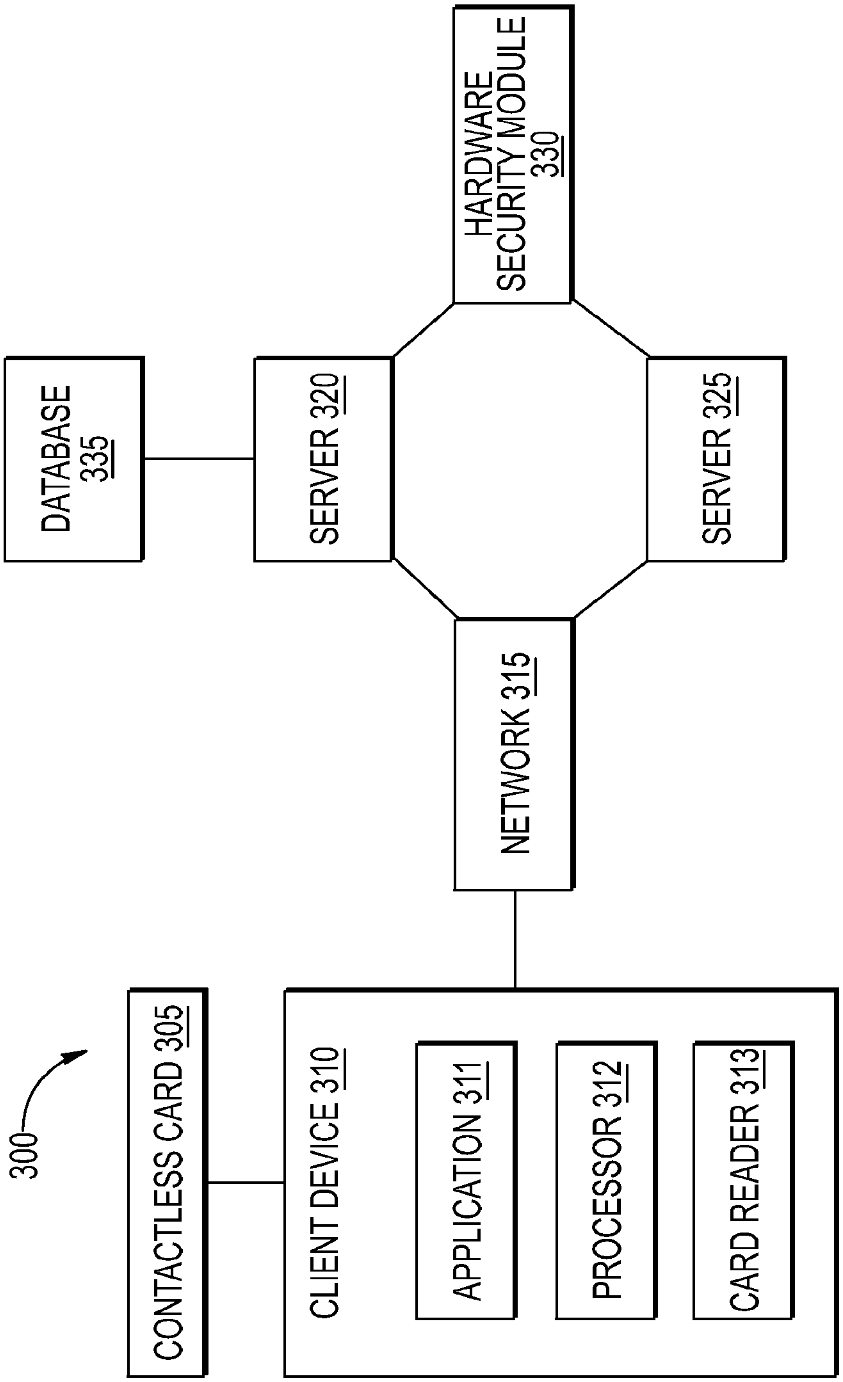
FIG. 3 is a diagram of a system using a contactless card according to an example embodiment.

FIG. 3 illustrates a system 300 using a contactless card. System 300 may include a contactless card 305, one or more client devices 310, network 315, servers 320, 325, one or more hardware security modules 330, and a database 335. Although FIG. 3 illustrates single instances of the components, system 300 may include any number of components.

System 300 may include one or more contactless cards 305, which are further explained below with respect to FIGS. 5A-5B. In some examples, contactless card 305 may be in wireless communication, for example NFC communication, with client device 310. For example, contactless card 305 may comprise one or more chips, such as a radio frequency identification chip, configured to communication via NFC or other short-range protocols. In other embodiments, contactless card 305 may communicate with client device 310 through other means including, but not limited to, Bluetooth, satellite, Wi-Fi, wired communications, and/or any combination of wireless and wired connections. According to some embodiments, contactless card 305 may be configured to communicate with card reader 313 of client device 310 through NFC when contactless card 305 is within range of card reader 313. In other examples, communications with contactless card 305 may be accomplished through a physical interface, e.g., a universal serial bus interface or a card swipe interface.

System 300 may include client device 310, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 310 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 310 may be the same as, or similar to, a client device 110 as described with reference to FIG. 1A or FIG. 1B.

Client device 310 may be in communication with one or more servers 320 and 325 via one or more networks 315. Client device 310 may transmit, for example from an application 311 executing on client device 310, one or more requests to one or more servers 320 and 325. The one or more requests may be associated with retrieving data from one or more servers 320 and 325. Servers 320 and 325 may receive the one or more requests from client device 310. Based on the one or more requests from client device 310, one or more servers 320 and 325 may be configured to retrieve the requested data from one or more databases 335. Based on receipt of the requested data from the one or more databases 335, one or more servers 320 and 325 may be configured to transmit the received data to client device 310, the received data being responsive to one or more requests.

System 300 may include one or more hardware security modules (HSM) 330. For example, one or more HSMs 330 may be configured to perform one or more cryptographic operations as disclosed herein. In some examples, one or more HSMs 330 may be configured as special purpose security devices that are configured to perform the one or more cryptographic operations. The HSMs 330 may be configured such that keys are never revealed outside the HSM 330, and instead are maintained within the HSM 330. For example, one or more HSMs 330 may be configured to perform at least one of key derivations, decryption, and MAC operations. The one or more HSMs 330 may be contained within, or may be in data communication with, servers 320 and 325.

System 300 may include one or more networks 315. In some examples, network 315 may be one or more of a wireless network, a wired network or any combination of wireless network and wired network, and may be configured to connect client device 315 to server 320 and 325. For example, network 315 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 305 and client device 310 may comprise NFC communication, cellular network between client device 310 and a carrier, and Internet between the carrier and a back-end.

In addition, network 315 may include, without limitation, telephone lines, fiber optics, IEEE Ethernet 902.3, a wide area network, a wireless personal area network, a local area network, or a global network such as the Internet. In addition, network 315 may support an Internet network, a wireless communication network, a cellular network, or the like, or any combination thereof. Network 315 may further include one network, or any number of the exemplary types of networks mentioned above, operating as a stand-alone network or in cooperation with each other. Network 315 may utilize one or more protocols of one or more network elements to which they are communicatively coupled. Network 315 may translate to or from other protocols to one or more protocols of network devices. Although network 315 is depicted as a single network, it should be appreciated that according to one or more examples, network 315 may comprise a plurality of interconnected networks, such as, for example, the Internet, a service provider's network, a cable television network, corporate networks, such as credit card association networks, and home networks.

In various examples according to the present disclosure, client device 310 of system 300 may execute one or more applications 311, and include one or more processors 312, and one or more card readers 313. For example, one or more applications 311, such as software applications, may be configured to enable, for example, network communications with one or more components of system 300 and transmit and/or receive data. It is understood that although only single instances of the components of client device 310 are illustrated in FIG. 3, any number of devices 310 may be used. Card reader 313 may be configured to read from and/or communicate with contactless card 305. In conjunction with the one or more applications 311, card reader 313 may communicate with contactless card 305.

The application 311 of any of client device 310 may communicate with the contactless card 305 using short-range wireless communication (e.g., NFC). The application 311 may be configured to interface with a card reader 313 of client device 310 configured to communicate with a contactless card 305. As should be noted, those skilled in the art would understand that a distance of less than twenty centimeters is consistent with NFC range.

In some embodiments, the application 311 communicates through an associated reader (e.g., card reader 313) with the contactless card 305.

In some embodiments, card activation may occur without user authentication. For example, a contactless card 305 may communicate with the application 311 through the card reader 313 of the client device 310 through NFC. The communication (e.g., a tap of the card proximate the card reader 313 of the client device 310) allows the application 311 to read the data associated with the card and perform an activation. In some cases, the tap may activate or launch application 311 and then initiate one or more actions or communications with an account server 325 to activate the card for subsequent use. In some cases, if the application 311 is not installed on client device 310, a tap of the card against the card reader 313 may initiate a download of the application 311 (e.g., navigation to an application download page). Subsequent to installation, a tap of the card may activate or launch the application 311, and then initiate (e.g., via the application or other back-end communication) activation of the card. After activation, the card may be used in various transactions including commercial transactions.

According to some embodiments, the contactless card 305 may include a virtual payment card. In those embodiments, the application 311 may retrieve information associated with the contactless card 305 by accessing a digital wallet implemented on the client device 310, wherein the digital wallet includes the virtual payment card. In some examples, virtual payment card data may include one or more static or dynamically generated virtual card numbers.

Server 320 may comprise a web server in communication with database 335. Server 325 may comprise an account server. In some examples, server 320 may be configured to validate one or more credentials from contactless card 305 and/or client device 310 by comparison with one or more credentials in database 335. Server 325 may be configured to authorize one or more requests, such as payment and transaction, from contactless card 305 and/or client device 310.

Figure 4:
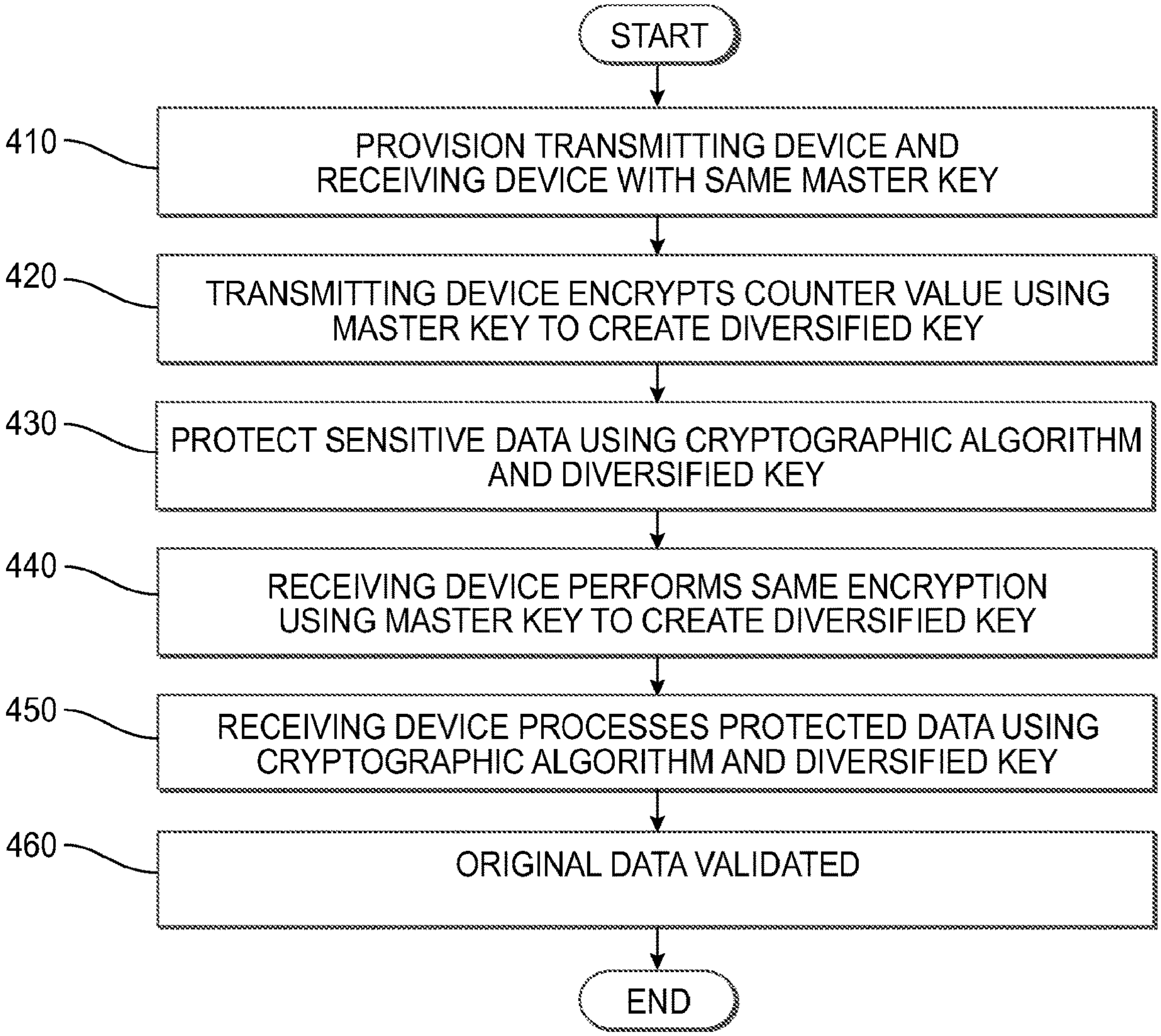
FIG. 4 is a flowchart illustrating a method of key diversification according to an example embodiment.

FIG. 4 illustrates a method 400 of key diversification according to an example of the present disclosure. Method 400 may include a transmitting device and receiving device similar to transmitting device 205 and receiving device 210 referenced in FIG. 2.

For example, a sender and recipient may desire to exchange data (e.g., original sensitive data) via a transmitting device and a receiving device. As explained above, although these two parties may be included, it is understood that one or more transmitting devices and one or more receiving devices may be involved so long as each party shares the same shared secret symmetric key. In some examples, the transmitting device and receiving device may be provisioned with the same master symmetric key. Further, it is understood that any party or device holding the same secret symmetric key may perform the functions of the transmitting device and similarly any party holding the same secret symmetric key may perform the functions of the receiving device. In some examples, the symmetric key may comprise the shared secret symmetric key which is kept secret from all parties other than the transmitting device and the receiving device involved in exchanging the secure data. It is further understood that both the transmitting device and receiving device may be provided with the same master symmetric key, and further that part of the data exchanged between the transmitting device and receiving device comprises at least a portion of data which may be referred to as the counter value. The counter value may comprise a number that changes each time data is exchanged between the transmitting device and the receiving device.

At block 410, a transmitting device and receiving device may be provisioned with the same master key, such as the same master symmetric key. When the transmitting device is preparing to process the sensitive data with symmetric cryptographic operation, the sender may update a counter. In addition, the transmitting device may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm, such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

The transmitting device may take the selected cryptographic algorithm, and using the master symmetric key, process the counter value. For example, the sender may select a symmetric encryption algorithm, and use a counter which updates with every conversation between the transmitting device and the receiving device.

At block 420, the transmitting device may then encrypt the counter value with the selected symmetric encryption algorithm using the master symmetric key, creating a diversified symmetric key. The diversified symmetric key may be used to process the sensitive data before transmitting the result to the receiving device. For example, the transmitting device may encrypt the sensitive data using a symmetric encryption algorithm using the diversified symmetric key, with the output comprising the protected encrypted data. The transmitting device may then transmit the protected encrypted data, along with the counter value, to the receiving device for processing. In some examples, a cryptographic operation other than encryption may be performed, and a plurality of cryptographic operations may be performed using the diversified symmetric keys prior to transmittal of the protected data.

In some examples, the counter value may not be encrypted. In these examples, the counter value may be transmitted between the transmitting device and the receiving device at block 420 without encryption.

At block 430, sensitive data may be protected using one or more cryptographic algorithms and the diversified keys. The diversified session keys, which may be created by the key diversification which uses the counter, may be used with one or more cryptographic algorithms to protect the sensitive data. For example, data may be processed by a MAC using a first diversified session key, and the resulting output may be encrypted using the second diversified session key producing the protected data.

At block 440, the receiving device may perform the same symmetric encryptions using the counter value as input to the encryptions and the master symmetric keys as the keys for the encryption. The output of the encryptions may be the same diversified symmetric key values that were created by the sender. For example, the receiving device may independently create its own copies of the first and second diversified session keys using the counter. Then, the receiving device may decrypt the protected data using the second diversified session key to reveal the output of the MAC created by the transmitting device. The receiving device may then process the resultant data through the MAC operation using the first diversified session key.

At block 450, the receiving device may use the diversified keys with one or more cryptographic algorithms to validate the protected data.

At block 460, the original data may be validated. If the output of the MAC operation (via the receiving device using the first diversified session key) matches the MAC output revealed by decryption, then the data may be deemed valid.

The next time sensitive data needs to be sent from the transmitting device to the receiving device, a different counter value may be selected, which produces a different diversified symmetric key. By processing the counter value with the master symmetric key and same symmetric cryptographic algorithm, both the transmitting device and receiving device may independently produce the same diversified symmetric key. This diversified symmetric key, not the master symmetric key, is used to protect the sensitive data.

As explained above, both the transmitting device and receiving device each initially possess the shared master symmetric key. The shared master symmetric key is not used to encrypt the original sensitive data. Because the diversified symmetric key is independently created by both the transmitting device and receiving device, it is never transmitted between the two parties. Thus, an attacker cannot intercept the diversified symmetric key and the attacker never sees any data which was processed with the master symmetric key. Only the small counter value is processed with the master symmetric key, not the sensitive data. As a result, reduced side-channel data about the master symmetric key is revealed. Moreover, the sender and the recipient may agree, for example by prior arrangement or other means, how often to create a new diversification value, and therefore a new diversified symmetric key. In an embodiment, a new diversification value and therefore a new diversified symmetric key may be created for every exchange between the transmitting device and receiving device.

In some examples, the key diversification value may comprise the counter value. Other non-limiting examples of the key diversification value include: a random nonce generated each time a new diversified key is needed, the random nonce sent from the transmitting device to the receiving device; the full value of a counter value sent from the transmitting device and the receiving device; a portion of a counter value sent from the transmitting device and the receiving device; a counter independently maintained by the transmitting device and the receiving device but not sent between the two; a one-time-passcode exchanged between the transmitting device and the receiving device; cryptographic hash of the sensitive data. In some examples, one or more portions of the key diversification value may be used by the parties to create multiple diversified keys. For example, a counter may be used as the key diversification value.

In another example, a portion of the counter may be used as the key diversification value. If multiple master key values are shared between the parties, the multiple diversified key values may be obtained by the system and processes described herein. A new diversification value, and therefore a new diversified symmetric key, may be created as often as needed. In the most secure case, a new diversification value may be created for each exchange of sensitive data between the transmitting device and the receiving device. In effect, this may create a one-time use key, such as a single session key.

In other examples, such as to limit the number of times of use of the master symmetric key, it may be agreed upon by the sender of transmitting device and recipient of the receiving device that a new diversification value, and therefore a new diversified symmetric key, will happen only periodically. In one example, this may be after a pre-determined number of uses, such as every 10 transmissions between the transmitting device and the receiving device. In another example, this may be after a certain time period, a certain time period after a transmission, or on a periodic basis (e.g., daily at a designated time; weekly at a designated time on a designated day). In another example, this may be every time the receiving device signals to the transmitting device that it desires to change the key on the next communication. This may be controlled on policy and may be varied due to, for example, the current risk level perceived by the recipient of the receiving device.

Figure 5A:
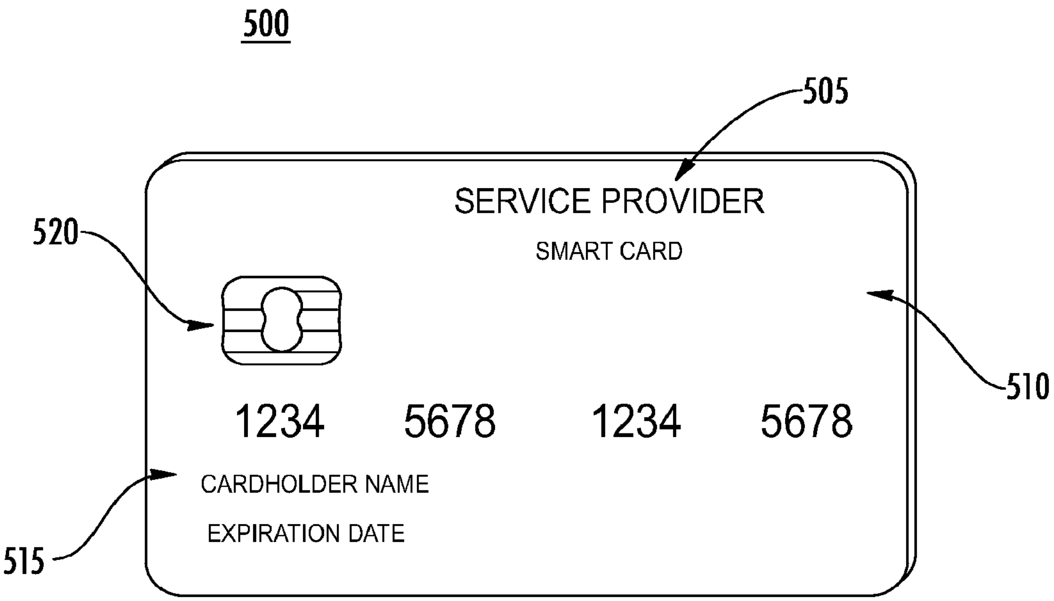
FIG. 5A is an illustration of a contactless card according to an example embodiment.

FIG. 5A illustrates one or more contactless cards 500, which may comprise a payment card, such as a credit card, debit card, or gift card, issued by a service provider 505 displayed on the front or back of the card 500. In some examples, the contactless card 500 is not related to a payment card, and may comprise, without limitation, an identification card. In some examples, the payment card may comprise a dual interface contactless payment card. The contactless card 500 may comprise a substrate 510, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 500 may have physical characteristics compliant with the ID-1 format of the ISO/IEC 7810 standard, and the contactless card may otherwise be compliant with the ISO/IEC 14443 standard. However, it is understood that the contactless card 500 according to the present disclosure may have different characteristics, and the present disclosure does not require a contactless card to be implemented in a payment card.

The contactless card 500 may also include identification information 515 displayed on the front and/or back of the card, and a contact pad 520. The contact pad 520 may be configured to establish contact with another communication device, such as a user device, smart phone, laptop, desktop, or tablet computer. The contactless card 500 may also include processing circuitry, antenna and other components not shown in FIG. 5A. These components may be located behind the contact pad 520 or elsewhere on the substrate 510. The contactless card 500 may also include a magnetic strip or tape, which may be located on the back of the card (not shown in FIG. 5A).

Figure 5B:
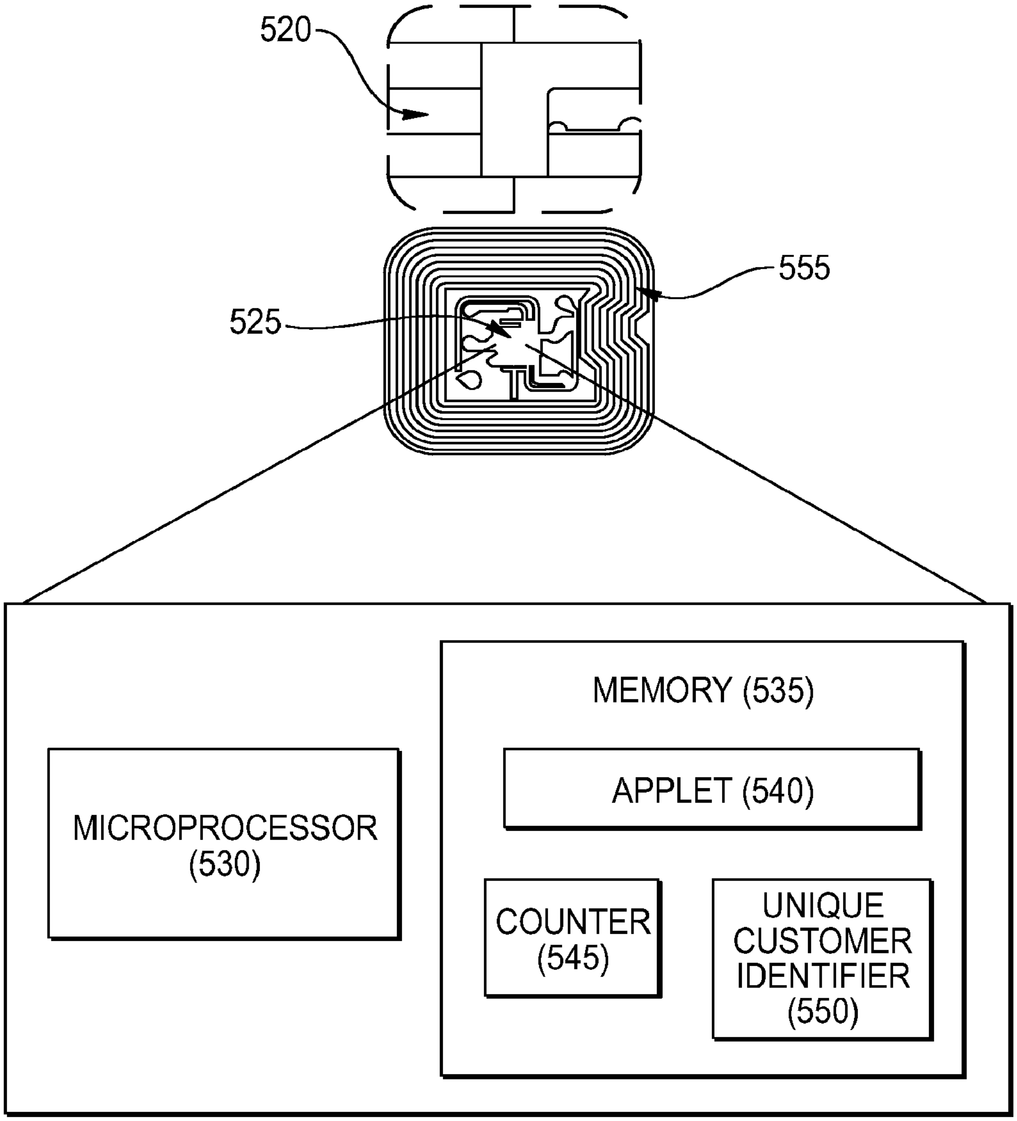
FIG. 5B is an illustration of a contact pad of the contactless card according to an example embodiment.

As illustrated in FIG. 5B, the contact pad 520 of FIG. 5A may include processing circuitry 525 for storing and processing information, including a microprocessor 530 and a memory 535. It is understood that the processing circuitry 525 may contain additional components, including processors, memories, error and parity/CRC checkers, data encoders, anticollision algorithms, controllers, command decoders, security primitives and tamperproofing hardware, as necessary to perform the functions described herein.

The memory 535 may be a read-only memory, write-once read-multiple memory or read/write memory, e.g., RAM, ROM, and EEPROM, and the contactless card 500 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 535 may be configured to store one or more applets 540, one or more counters 545, and a customer identifier 550. The one or more applets 540 may comprise one or more software applications configured to execute on one or more contactless cards, such as Java Card applet. However, it is understood that applets 540 are not limited to Java Card applets, and instead may be any software application operable on contactless cards or other devices having limited memory. The one or more counters 545 may comprise a numeric counter sufficient to store an integer. The customer identifier 550 may comprise a unique alphanumeric identifier assigned to a user of the contactless card 500, and the identifier may distinguish the user of the contactless card from other contactless card users. In some examples, the customer identifier 550 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 520 or entirely separate from it, or as further elements in addition to processor 530 and memory 535 elements located within the contact pad 520.

In some examples, the contactless card 500 may comprise one or more antennas 555. The one or more antennas 555 may be placed within the contactless card 500 and around the processing circuitry 525 of the contact pad 520. For example, the one or more antennas 555 may be integral with the processing circuitry 525 and the one or more antennas 555 may be used with an external booster coil. As another example, the one or more antennas 555 may be external to the contact pad 520 and the processing circuitry 525.

In an embodiment, the coil of contactless card 500 may act as the secondary of an air core transformer. The terminal may communicate with the contactless card 500 by cutting power or amplitude modulation. The contactless card 500 may infer the data transmitted from the terminal using the gaps in the contactless card's power connection, which may be functionally maintained through one or more capacitors. The contactless card 500 may communicate back by switching a load on the contactless card's coil or load modulation. Load modulation may be detected in the terminal's coil through interference.

As explained above, the contactless cards 500 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

Figure 6:
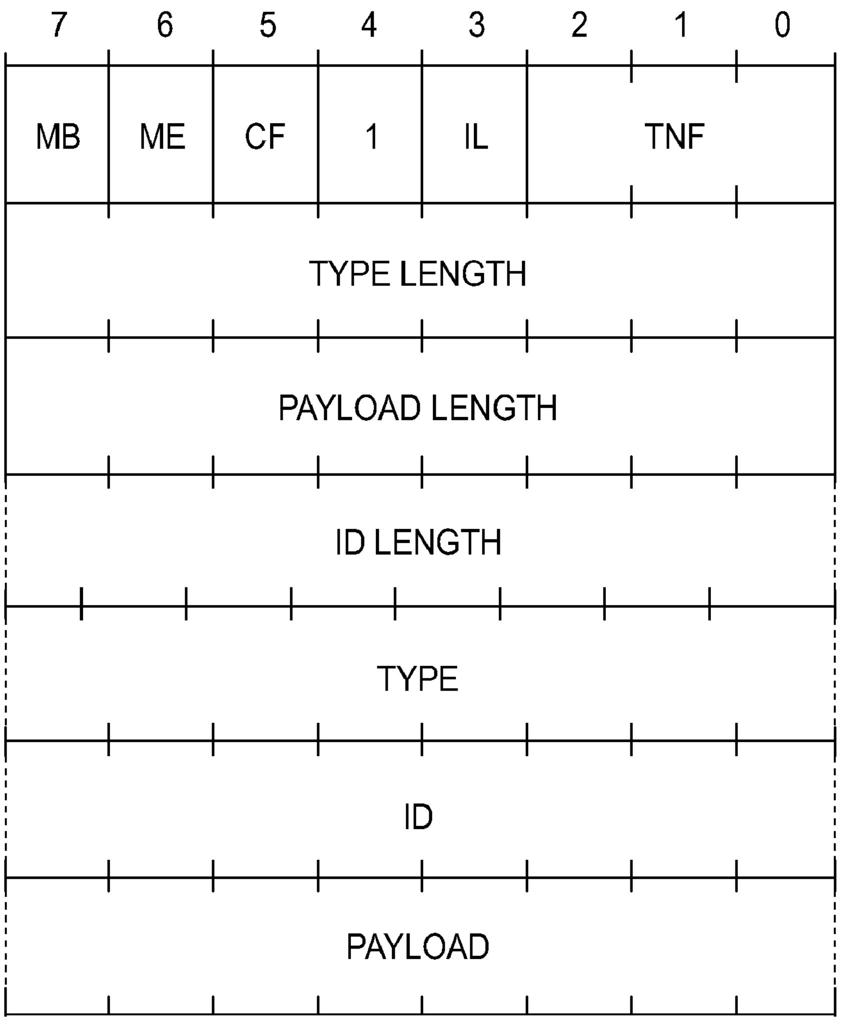
FIG. 6 is an illustration depicting a message to communicate with a device according to an example embodiment.

FIG. 6 illustrates NDEF short-record layout (SR=1) 600 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

FIG. 7 illustrates a message 710 and a message format 720 according to an example embodiment. In one example, if additional tags are to be added, the first byte may change to indicate message begin, but not end, and a subsequent record may be added. Because ID length is zero, ID length field and ID are omitted from the record. An example message may include: UDK AUT key; Derived AUT session key (using 0x00000050); Version 1.0; pATC=0x00000050; RND=4838FB7DC171B89E; MAC=<eight computed bytes>.

In some examples, data may be stored in the contactless card at personalization time by implementing STORE DATA (E2) under secure channel protocol 2. One or more values may be read by the personalization bureau from the EMBOSS files (in a section designated by the Applet ID) and one or more store data commands may be transmitted to the contactless card after authentication and secure channel establishment.

pUID may comprise a 16-digit BCD encoded number. In some examples, pUID may comprise 14 digits.

| Item | Length (bytes) | Encrypted? | Notes |
|---|---|---|---|
| pUID | 8 | No | |
| AutKey | 16 | Yes | 3DES Key for Deriving MAC session keys |
| AutKCV | 3 | No | Key Check Value |
| DEKKey | 16 | Yes | 3DES Key for deriving Encryption session key |
| DEKKCV | 3 | No | Key Check Value |
| Card Shared Random | 4 bytes | No | 4 Byte True Random number (pre-generated) |
| NTLV | X Bytes | No | TLV data for NDEF message |

In some examples, the one or more applets may be configured to maintain its personalization state to allow personalization only if unlocked and authenticated. Other states may comprise standard states pre-personalization. On entering into a terminated state, the one or more applets may be configured to remove personalization data. In the terminated state, the one or more applets may be configured to stop responding to all application protocol data unit (APDU) requests.

The one or more applets may be configured to maintain an applet version (2 bytes), which may be used in the authentication message. In some examples, this may be interpreted as most significant byte major version, least significant byte minor version. The rules for each of the versions are configured to interpret the authentication message: For example, regarding the major version, this may include that each major version comprise a specific authentication message layout and specific algorithms. For the minor version, this may include no changes to the authentication message or cryptographic algorithms, and changes to static tag content, in addition to bug fixes, security hardening, etc.

In some examples, the one or more applets may be configured to emulate an RFID tag. The RFID tag may include one or more polymorphic tags. In some examples, each time the tag is read, different cryptographic data is presented that may indicate the authenticity of the contactless card. Based on the one or more applications, an NFC read of the tag may be processed, the token may be transmitted to a server, such as a backend server, and the token may be validated at the server.

In some examples, the contactless card and server may include certain data such that the card may be properly identified. The contactless card may comprise one or more unique identifiers. Each time a read operation takes place, a counter may be configured to update. In some examples, each time the card is read, it is transmitted to the server for validation and determines whether the counter is equal (as part of the validation).

The one or more counters may be configured to prevent a replay attack. For example, if a cryptogram has been obtained and replayed, that cryptogram is immediately rejected if the counter has been read or used or otherwise passed over. If the counter has not been used, it may be replayed. In some examples, the counter that is updated on the card is different from the counter that is updated for transactions. In some examples, the contactless card may comprise a first applet, which may be a transaction applet, and a second applet. Each applet may comprise a counter.

In some examples, the counter may get out of sync between the contactless card and one or more servers. For example, the contactless card may be activated causing the counter to be updated and a new communication to be generated by the contactless card, but the communication may be not be transmitted for processing at the one or more servers. This may cause the counter of the contactless card and the counter maintained at the one or more servers to get out of sync. This may occur unintentionally including, for example, where a card is stored adjacent to a device (e.g., carried in a pocket with a device) and where the contactless card is read at an angle may include the card being misaligned or not positioned such that the contactless card is powered up an the NFC field but is not readable. If the contactless card is positioned adjacent to a device, the device's NFC field may be turned on to power the contactless card causing the counter therein to be updated, but no application on the device receives the communication.

To keep the counter in sync, an application, such as a background application, may be executed that would be configured to detect when the mobile device wakes up and synchronize with the one or more servers indicating that a read that occurred due to detection to then move the counter forward. Since the counters of the contactless card and the one or more servers may get out of sync, the one or more servers may be configured to allow the counter of the contactless card to be updated a threshold or predetermined number of times before it is read by the one or more servers and still be considered valid. For example, if the counter is configured to increment (or decrement) by one for each occurrence indicating activation of the contactless card, the one or more servers may allow any counter value it reads from the contactless card as valid, or any counter value within a threshold range (e.g., from 1 to 10). Moreover, the one or more servers may be configured to request a gesture associated with the contactless card, such as a user tap, if it reads a counter value which has advanced beyond 10, but below another threshold range value (such as 1000). From the user tap, if the counter value is within a desired or acceptance range, authentication succeeds.

Figure 8:
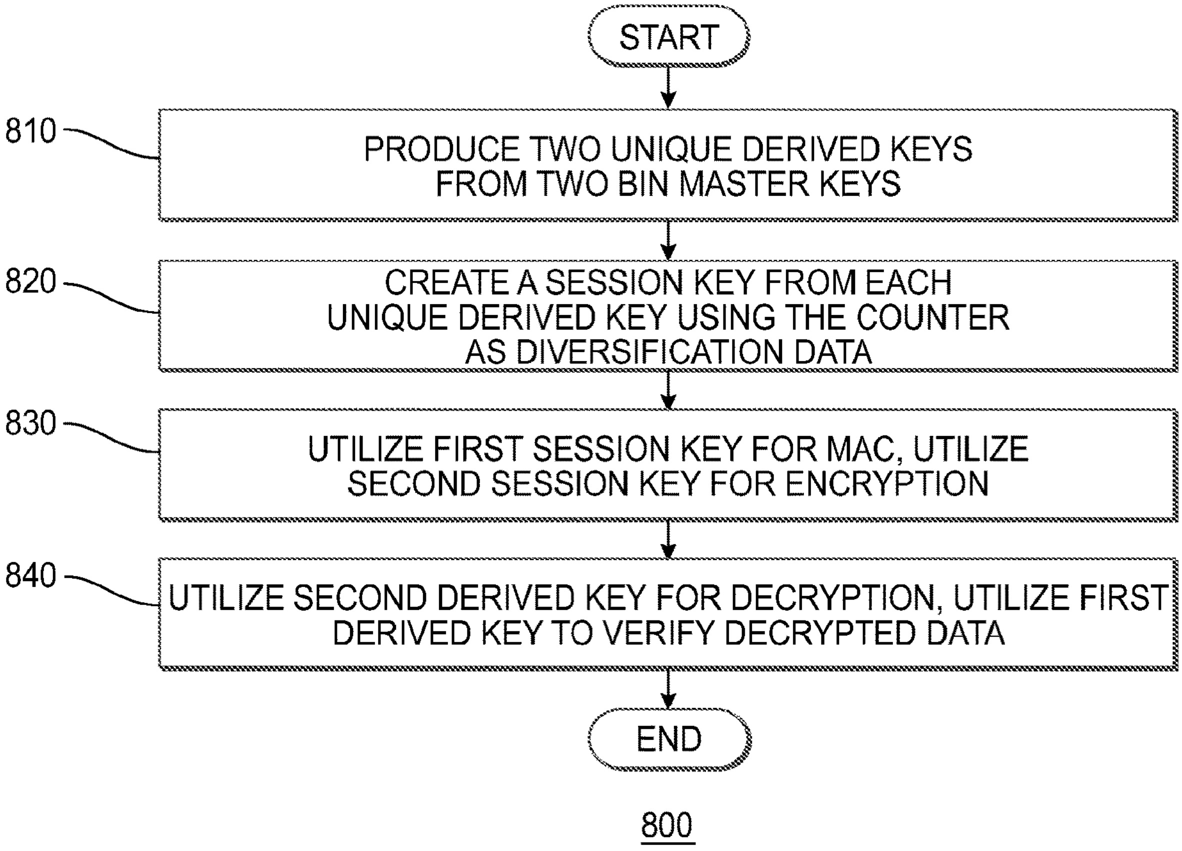
FIG. 8 is a flowchart illustrating key operations according to an example embodiment.

FIG. 8 is a flowchart illustrating key operations 800 according to an example embodiment. As illustrated in FIG. 8, at block 810, two bank identifier number (BIN) level master keys may be used in conjunction with the account identifier and card sequence number to produce two unique derived keys (UDKs) per card. In some examples, a bank identifier number may comprise one number or a combination of one or more numbers, such as an account number or an unpredictable number provided by one or more servers, may be used for session key generation and/or diversification. The UDKs (AUTKEY and ENCKEY) may be stored on the card during the personalization process.

At block 820, the counter may be used as the diversification data, since it changes with each use and provides a different session key each time, as opposed to the master key derivation in which one unique set of keys per card is produced. In some examples, it is preferable to use the 4-byte method for both operations. Accordingly, at block 820, two session keys may be created for each transaction from the UDKs, i.e., one session key from AUTKEY and one session key from ENCKEY. In the card, for the MAC key (i.e., the session key created from AUTKEY), the low order of two bytes of the OTP counter may be used for diversification. For the ENC key (i.e., the session key created from ENCKEY), the full length of the OTP counter may be used for the ENC key.

At block 830, the MAC key may be used for preparing the MAC cryptogram, and the ENC key may be used to encrypt the cryptogram. For example, the MAC session key may be used to prepare the cryptogram, and the result may be encrypted with the ENC key before it is transmitted to the one or more servers.

At block 840, verification and processing of the MAC is simplified because 2-byte diversification is directly supported in the MAC authentication functions of payment HSMs. Decryption of the cryptogram is performed prior to verification of the MAC. The session keys are independently derived at the one or more servers, resulting in a first session key (the ENC session key) and a second session key (the MAC session key). The second derived key (i.e., the ENC session key) may be used to decrypt the data, and the first derived key (i.e., the MAC session key) may be used to verify the decrypted data.

For the contactless card, a different unique identifier is derived which may be related to the application primary account number (PAN) and PAN sequence number, which is encoded in the card. The key diversification may be configured to receive the identifier as input with the master key such that one or more keys may be created for each contactless card. In some examples, these diversified keys may comprise a first key and a second key. The first key may include an authentication master key (Card Cryptogram Generation/Authentication Key-Card-Key-Auth), and may be further diversified to create a MAC session key used when generating and verifying a MAC cryptogram. The second key may comprise an encryption master key (Card Data Encryption Key-Card-Key-DEK), and may be further diversified to create an ENC session key used when encrypting and decrypting enciphered data. In some examples, the first and the second keys may be created by diversifying the issuer master keys by combining them with the card's unique ID number (pUID) and the PAN sequence number (PSN) of a payment applet. The pUID may comprise a 16-digit numerical value. As explained above, pUID may comprise a 16 digit BCD encoded number. In some examples, pUID may comprise a 14-digit numerical value.

In some examples, since the EMV session key derivation method may wrap at 2^16 uses, the counter such as the full 32-bit counter may be added to the initialization arrays of the diversification method.

In other examples, such as credit cards, a number, such as an account number or an unpredictable number provided by one or more servers, may be used for session key generation and/or diversification.

Figure 9:
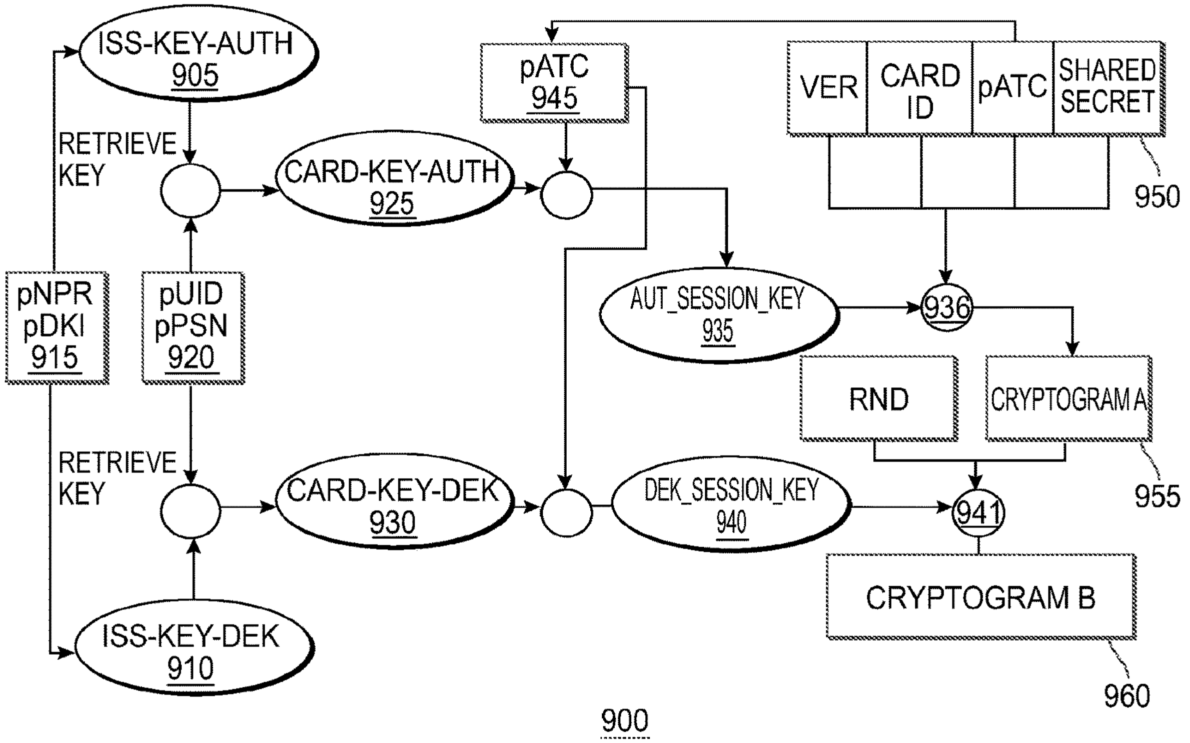
FIG. 9 is a diagram of a key system according to an example embodiment.

FIG. 9 illustrates a diagram of a system 900 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 905, 910 may be required for each part of the portfolio on which the one or more applets is issued. For example, the first master key 905 may comprise an Issuer Cryptogram Generation/Authentication Key (Iss-Key-Auth) and the second master key 910 may comprise an Issuer Data Encryption Key (Iss-Key-DEK). As further explained herein, two issuer master keys 905, 910 are diversified into card master keys 925, 930, which are unique for each card. In some examples, a network profile record ID (pNPR) 915 and derivation key index (pDKI) 920, as back office data, may be used to identify which Issuer Master Keys 905, 910 to use in the cryptographic processes for authentication. The system performing the authentication may be configured to retrieve values of pNPR 915 and pDKI 920 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 925 and Card-Key-Dek 930). The session keys (Aut-Session-Key 935 and DEK-Session-Key 940) may be generated by the one or more applets and derived by using the application transaction counter (pATC) 945 with one or more algorithms. To fit data into the one or more algorithms, only the 2 low order bytes of the 4-byte pATC 945 is used. In some examples, the four byte session key derivation method may comprise: F1: =PATC (lower 2 bytes)||'F0' ||'00'|| PATC (four bytes) F1: =PATC (lower 2 bytes)||'0F'||'00'|| PATC (four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC 945 counter. At each tap of the contactless card, pATC 945 is configured to be updated, and the card master keys Card-Key-AUTH 925 and Card-Key-DEK 930 are further diversified into the session keys Aut-Session-Key 935 and DEK-Session-KEY 940. pATC 945 may be initialized to zero at personalization or applet initialization time. In some examples, the pATC counter 945 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 935. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 935, as explained above. As explained above, the low order two bytes of the counter may be used to diversify for the one or more MAC session keys. As explained below, AUT-Session-Key 935 may be used to MAC data 950, and the resulting data or cryptogram A 955 and random number RND may be encrypted using DEK-Session-Key 940 to create cryptogram B or output 960 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 940 derived from the Card-Key-DEK 930. In this case, the ATC value for the session key derivation is the least significant byte of the counter pATC 945.

The format below represents a binary version example embodiment. Further, in some examples, the first byte may be set to ASCII 'A'.

| Message Format | | | | | |
|---|---|---|---|---|---|
| 1 | 2 | 4 | | 8 | 8 |
| 0x43 (Message Type 'A') | Version | pATC | | RND | Cryptogram A (MAC) |
| Cryptogram A (MAC) | 8 bytes | | | | |
| MAC of | | | | | |
| 2 | 8 | 4 | 4 | 18 bytes input data | |
| Version | pUID | pATC | Shared Secret | | |

| Message Format | | | |
|---|---|---|---|
| 1 | 2 | 4 | 16 |
| 0x43 (Message Type 'A') | Version | pATC | Cryptogram B |
| Cryptogram A (MAC) | 8 bytes | | |
| MAC of | | | |

-continued

| Message Format | | | | |
|---|---|---|---|---|
| 2 | 8 | 4 | 4 | 18 bytes input data |
| Version | pUID | pATC | Shared Secret | |
| Cryptogram B | 16 | | | |
| Sym Encryption of | | | | |
| 8 | 8 | | | |
| RND | Cryptogram A | | | |

Another exemplary format is shown below. In this example, the tag may be encoded in hexadecimal format.

| Message Format | | | | | | |
|---|---|---|---|---|---|---|
| 2 | 8 | 4 | | 8 | | 8 |
| Version | pUID | pATC | | RND | | Cryptogram A (MAC) |
| 8 bytes | | | | | | |
| 8 | 8 | 4 | 4 | | 18 bytes input data | |
| pUID | pUID | pATC | Shared Secret | | | |

| Message Format | | | | | |
|---|---|---|---|---|---|
| 2 | 8 | 4 | | 16 | |
| Version | pUID | pATC | | Cryptogram B | |
| 8 bytes | | | | | |
| 8 | | 4 | 4 | | 18 bytes input data |
| pUID | pUID | pATC | Shared Secret | | |
| Cryptogram B | 16 | | | | |
| Sym Encryption of | | | | | |
| 8 | 8 | | | | |
| RND | Cryptogram A | | | | |

The UID field of the received message may be extracted to derive, from master keys Iss-Key-AUTH 905 and Iss-Key-DEK 910, the card master keys (Card-Key-Auth 925 and Card-Key-DEK 930) for that particular card. Using the card master keys (Card-Key-Auth 925 and Card-Key-DEK 930), the counter (pATC) field of the received message may be used to derive the session keys (Aut-Session-Key 935 and DEK-Session-Key 940) for that particular card. Cryptogram B 960 may be decrypted using the DEK-Session-KEY, which yields cryptogram A 955 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 955, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 935. The input data 950 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 936, data 950 is processed through the MAC using Aut-Session-Key 935 to produce MAC output (cryptogram A) 955, which is encrypted.

In order to provide additional protection against brute force attacks exposing the keys on the card, it is desirable that the MAC cryptogram 955 be enciphered. In some examples, data or cryptogram A 955 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 940. In the encryption operation 941, data or cryptogram A 955 and RND are processed using DEK-Session-Key 940 to produce encrypted data, cryptogram B 960. The data 955 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 10:
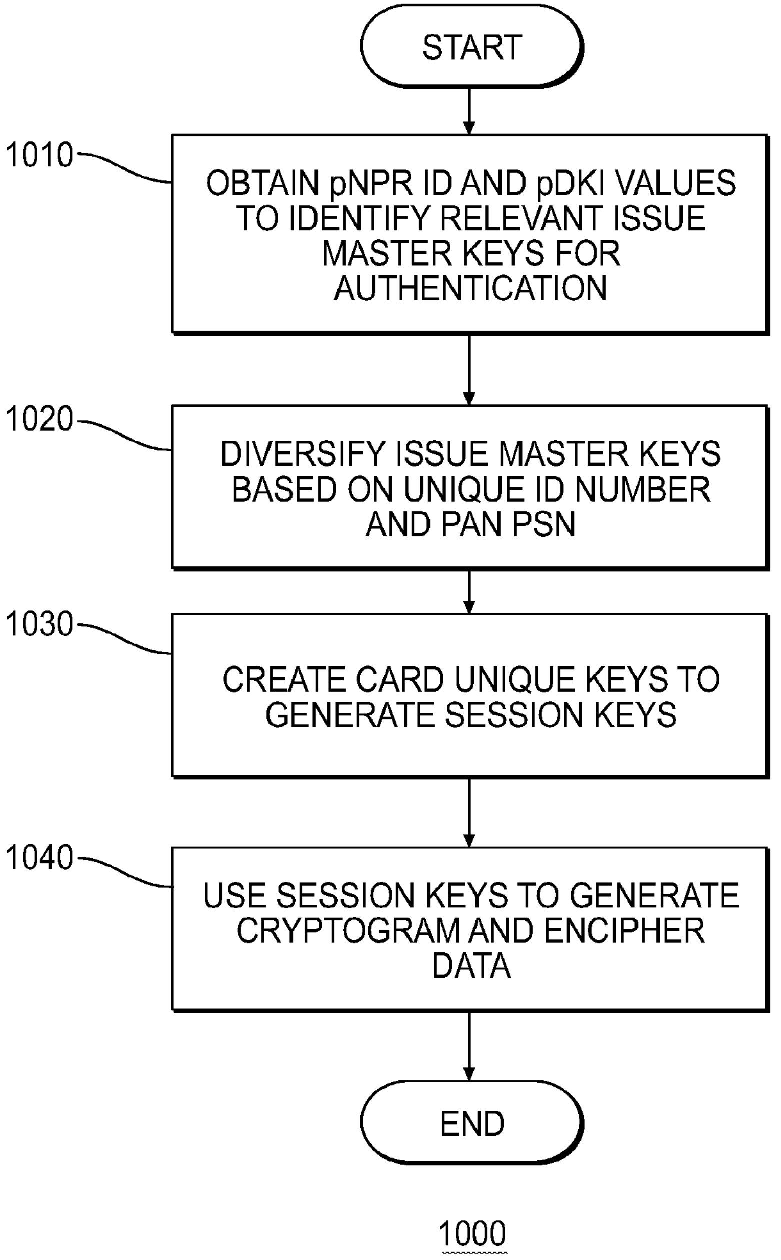
FIG. 10 is a flowchart of a method of generating a cryptogram according to an example embodiment.

FIG. 10 illustrates a method 1000 for generating a cryptogram. For example, at block 1010, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 1020, Issuer Master Keys may be diversified by combining them with the card's unique ID number (pUID) and the PAN sequence number (PSN) of one or more applets, for example, a payment applet.

At block 1030, Card-Key-Auth and Card-Key-DEK (unique card keys) may be created by diversifying the Issuer Master Keys to generate session keys which may be used to generate a MAC cryptogram.

At block 1040, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 11:
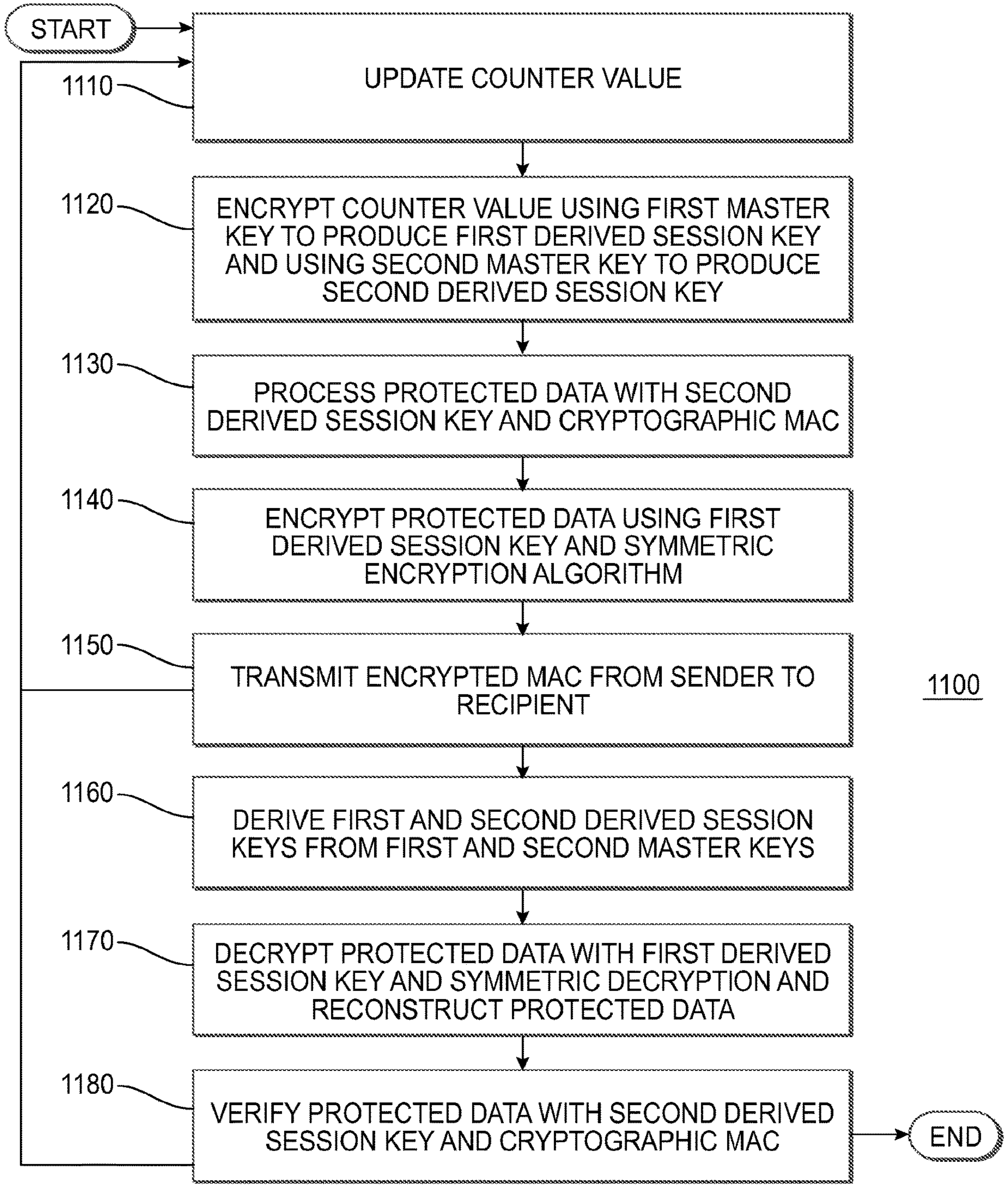
FIG. 11 is a flowchart illustrating a process of key diversification according to an example embodiment.

FIG. 11 depicts an exemplary process 1100 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1110, and other data, such as data to be protected, which it may secure share with the recipient.

At block 1120, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1130, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1140, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1150, the encrypted MAC is transmitted, from the sender to the recipient, with sufficient information to identify additional secret information (such as shared secret, master keys, etc.), for verification of the cryptogram.

At block 1160, the recipient uses the received counter value to independently derive the two derived session keys from the two master keys as explained above.

At block 1170, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1180, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1110) and a new set of session keys may be created (at block 1120). In some examples, the combined random data may be discarded.

Example embodiments of systems and methods described herein may be configured to provide security factor authentication. The security factor authentication may comprise a plurality of processes. As part of the security factor authentication, a first process may comprise logging in and validating a user via one or more applications executing on a device. As a second process, the user may, responsive to successful login and validation of the first process via the one or more applications, engage in one or more behaviors associated with one or more contactless cards. In effect, the security factor authentication may include both securely proving identity of the user and engaging in one or more types of behaviors, including but not limited to one or more tap gestures, associated with the contactless card. In some examples, the one or more tap gestures may comprise a tap of the contactless card by the user to a device. In some examples, the device may comprise a mobile device, a kiosk, a terminal, a tablet, or any other device configured to process a received tap gesture.

In some examples, the contactless card may be tapped to a device, such as one or more computer kiosks or terminals, to verify identity so as to receive a transactional item responsive to a purchase, such as a coffee. By using the contactless card, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card and the device, which may configured to process one or more tap gestures. As explained above, the one or more applications may be configured to validate identity of the user and then cause the user to act or respond to it, for example, via one or more tap gestures. In some examples, data for example, bonus points, loyalty points, reward points, healthcare information, etc., may be written back to the contactless card.

In some examples, the contactless card may be tapped to a device, such as a mobile device. As explained above, identity of the user may be verified by the one or more applications which would then grant the user a desired benefit based on verification of the identity.

In some examples, the contactless card may be activated by tapping to a device, such as a mobile device. For example, the contactless card may communicate with an application of the device via a card reader of the device through NFC communication. The communication, in which a tap of the card proximate the card reader of the device may allow the application of the device to read data associated with the contactless card and activate the card. In some examples, the activation may authorize the card to be used to perform other functions, e.g., purchases, access account or restricted information, or other functions. In some examples, the tap may activate or launch the application of the device and then initiate one or more actions or communications with one or more servers to activate the contactless card. If the application is not installed on the device, a tap of the contactless card proximate the card reader may initiate a download of the application, such as navigation to a download page of the application). Subsequent to installation, a tap of the contactless card may activate or launch the application, and then initiate, for example via the application or other back-end communication), activation of the contactless card. After activation, the contactless card may be used in various activities, including without limitation commercial transactions.

In some embodiments, a dedicated application may be configured to execute on a client device to perform the activation of the contactless card. In other embodiments, a webportal, a web-based app, an applet, and/or the like may perform the activation. Activation may be performed on the client device, or the client device may merely act as a go between for the contactless card and an external device (e.g., account server). According to some embodiments, in providing activation, the application may indicate, to the account server, the type of device performing the activation (e.g., personal computer, smartphone, tablet, or point-of-sale (POS) device). Further, the application may output, for transmission, different and/or additional data to the account server depending on the type of device involved. For example, such data may comprise information associated with a merchant, such as merchant type, merchant ID, and information associated with the device type itself, such as POS data and POS ID.

In some embodiments, the example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In some examples, the contactless card can selectively communicate information depending upon the recipient device. Once tapped, the contactless card can recognize the device to which the tap is directed, and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the contactless card tap is directed to a device running Apple's iOS® operating system, e.g., an iPhone, iPod, or iPad, the contactless card can recognize the iOS® operating system and transmit data appropriate data to communicate with this device. For example, the contactless card can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card can recognize the POS device and transmit only the information necessary for the action or transaction. For example, upon recognition of a POS device used to complete a commercial transaction, the contactless card can communicate payment information necessary to complete the transaction under the EMV standard.

In some examples, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In some examples the POS device can be affiliated with an authorized merchant or other entity familiar with certain contactless cards or accustomed to performing certain contactless card transactions. However, it is understood such an affiliation is not required for the performance of the described methods.

In some examples, such as a shopping store, grocery store, convenience store, or the like, the contactless card may be tapped to a mobile device without having to open an application, to indicate a desire or intent to utilize one or more of reward points, loyalty points, coupons, offers, or the like to cover one or more purchases. Thus, an intention behind the purchase is provided.

In some examples, the one or more applications may be configured to determine that it was launched via one or more tap gestures of the contactless card, such that a launch occurred at 3:51 pm, that a transaction was processed or took place at 3:56 pm, in order to verify identity of the user.

In some examples, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the contactless card.

In some examples, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In some examples, individuals who have different financial institutions may possess contactless cards to provide information to initiate one or more payment requests from the card-tapping individual.

The following example use cases describe examples of particular implementations of the present disclosure. These are intended solely for explanatory purposes and not for purposes of limitation. In one case, a first friend (payor) owes a second friend (payee) a sum of money. Rather than going to an ATM or requiring exchange through a peer-to-peer application, payor wishes to pay via payee's smartphone (or other device) using a contactless card. Payee logs-on to the appropriate application on his smartphone and selects a payment request option. In response, the application requests authentication via payee's contactless card. For example, the application outputs a display requesting that payee tap his contactless card. Once payee taps his contactless card against the screen of his smartphone with the application enabled, the contactless card is read and verified. Next, the application displays a prompt for payor to tap his contactless card to send payment. After the payor taps his contactless card, the application reads the card information and transmits, via an associated processor, a request for payment to payor's card issuer. The card issuer processes the transaction and sends a status indicator of the transaction to the smartphone. The application then outputs for display the status indicator of the transaction.

In another example case, a credit card customer may receive a new credit card (or debit card, other payment card, or any other card requiring activation) in the mail. Rather than activating the card by calling a provided telephone number associated with the card issuer or visiting a website, the customer may decide to activate the card via an application on his or her device (e.g., a mobile device such as a smartphone). The customer may select the card activation feature from the application's menu that is displayed on a display of the device. The application may prompt the customer to tap his or her credit card against the screen. Upon tapping the credit card against the screen of the device, the application may be configured to communicate with a server, such as a card issuer server which activates the customer's card. The application may then displays a message indicating successful activation of the card. The card activation would then be complete.

Figure 12:
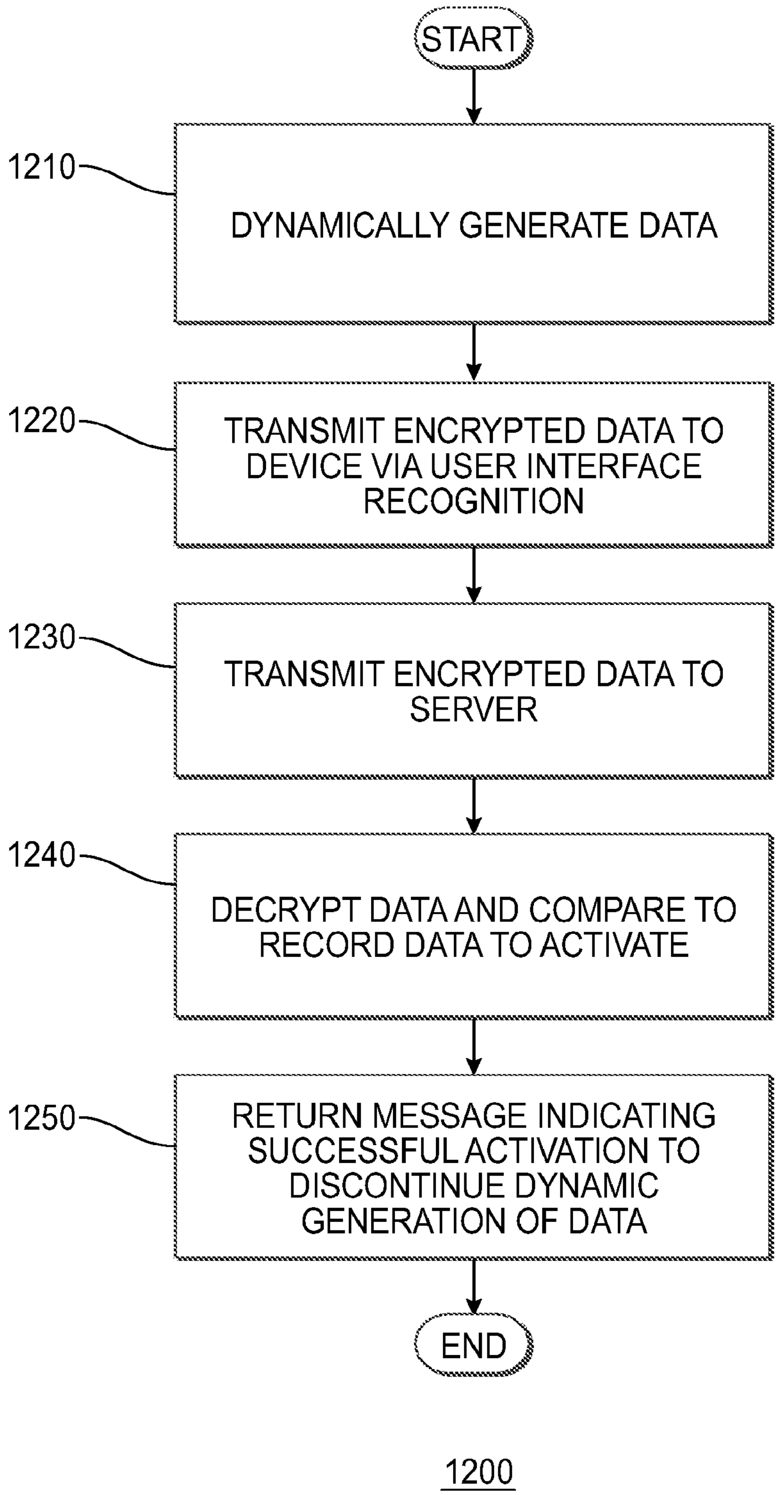
FIG. 12 is a flowchart illustrating a method for card activation according to an example embodiment.

FIG. 12 illustrates a method 1200 for card activation according to an example embodiment. For example, card activation may be completed by a system including a card, a device, and one or more servers. The contactless card, device, and one or more servers may reference same or similar components that were previously explained above with reference to FIG. 1A, FIG. 1B, FIG. 5A, and FIG. 5B, such as contactless card 105, client device 110, and server 120.

In block 1210, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1220, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1230, the one or more portions of the data may be communicated to one or more servers, such as a card issuer server. For example, one or more encrypted portions of the data may be transmitted from the device to the card issuer server for activation of the card.

In block 1240, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1250, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

In another example case, a customer wants to access his financial accounts on his or her mobile phone. The customer launches an application (e.g., a bank application) on the mobile device and inputs a username and password. At this stage, the customer may see first-level account information (e.g., recent purchases) and be able to perform first-level account options (e.g., pay credit-card). However, if the user attempts to access second-level account information (e.g., spending limit) or perform a second-level account option (e.g., transfer to external system) he must have a second-factor authentication. Accordingly, the application requests that a user provide a transaction card (e.g., credit card) for account verification. The user then taps his credit card to the mobile device, and the application verifies that the credit card corresponds to the user's account. Thereafter, the user may view second-level account data and/or perform second-level account functions.

As explained above, the counter may be incremented by the applet, e.g., each time an applet ID of an applet is requested over NFC. In some examples, the counter can only increment if it is in the magnetic field of a device, such as a mobile phone, and the applet ID is requested. However, if transactions with a server are interrupted or if the applet is only partly read, it is possible for the counter on the contactless card and the counter on the backend to get out of sync. Keeping these counters in sync is therefore critical to system security and integrity for a number of reasons, including preventing the playback of messages in multiple attempts. As further discussed below, the systems and methods describe how to resync the counter if the counters are not synchronized.

Some variability in the counters is permitted and perfect synchronization is not required. For resynchronization to occur, the backend may receive multiple reads of the applet, by the mobile device, to determine that it is incrementing and to obtain a new value with which to synchronize. Thus, the backend may determine if the counter value is arriving in the order as expected, and may be configured to disable the contactless card if it determines otherwise. The backend may be configured to not accept any number previously used for the counter, as explained below.

Figure 13:
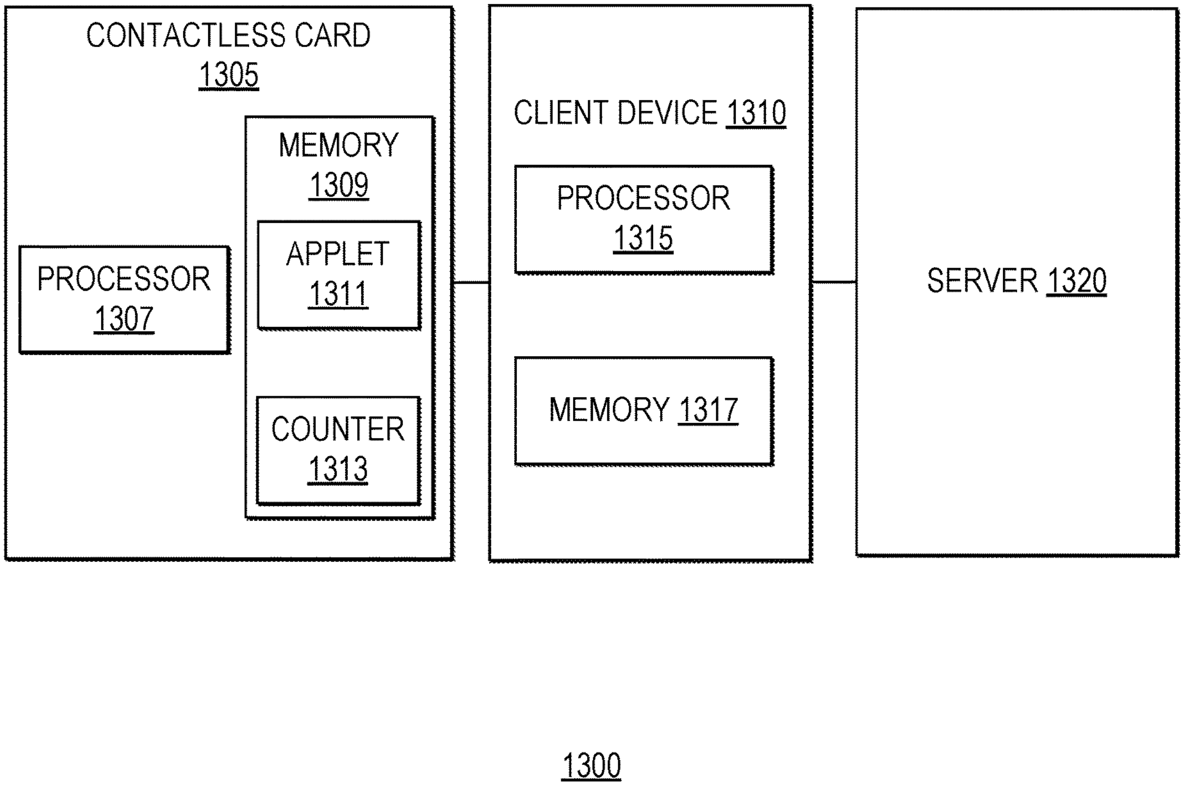
FIG. 13 is counter resynchronization system according to an example embodiment.

FIG. 13 illustrates a system 1300, such as a counter resynchronization system, comprising a contactless card 1305, a client device 1310, and one or more servers 1320. Although FIG. 13 illustrates single instances of the components, system 1300 may include any number of components. The contactless card 1305, client device 1310, and one or more servers 1320 may reference same or similar components that were previously explained above with reference to FIG. 1A, FIG. 1B, FIG. 5A, and FIG. 5B, such as contactless card 105, client device 110, and server 120.

The contactless card 1305 may include one or more processors 1307 and a memory 1309. The memory 1309 may comprise one or more applets 1311 and a counter 1313.

The client device 1310 may include one or more processors 1315 and a memory 1317. The client device 1310 may be in data communication with the contactless card 1305 via a communication interface (not shown).

The one or more servers 1320 may be in data communication with the client device 1310. The counter 1313 may be transmitted and compared by the one or more servers 1320 to an expected counter value for synchronization. By way of example, the one or more servers 1320 may be seeking a value that they are expecting. In one example, the counter of the contactless card may begin at zero. On the one or more servers 1320, its counter may begin at zero, and increment, for example by 1, such that the next expected counter would be 1. If 1 is the expected counter, and the one or more servers 1320 instead determines a different value, such as 10, a determination is made as to whether the different value is within a given window or range. To the extent that the different value is within the window or range, then the counter may be set to 10 and therefore accepted. To the extent that the different value is not within the window or range, for example 100, this value is clearly not equal to 1, the expected counter value, and one or more messages may be transmitted to the client device 1310. In some examples, the one or more messages may comprise an indication that the contactless card must be gestured one or more times. Responsive to these one or more gestures, the counter value may be 101, and this may be an acceptable number determined by the one or more servers 1320. However, in some examples, upon determination of any other number, the contactless card 1305 may be deactivated. In some examples, the contactless card 1305 may be shut down by the one or more servers 1320. For example, the one or more servers 1320 may halt data communication with the contactless card 1305 since the contactless card 1305 may be under attack, as discussed below.

The counter 1313 of the contactless card 1305 may be resynchronized, via one or more synchronization processes, based on one or more reads of the one or more applets 1311 of the contactless card 1305. The one or more servers 1320 may be configured to authenticate the contactless card 1305 based on the resynchronization.

The counter 1313 may be configured to signal one or more attacks, including but not limited to nefarious activities such as unauthorized use, excessive use, card tampering, card communication interference, or any combination thereof. In some examples, one or more attacks may be associated with physical access to the contactless card 1305. By way of example, these attacks may include attempted extraction of master keys for a secure element of the contactless card 1305; side channel attacks through other communication pathways, such as the EMV chip contact interface; and/or fuzzing of the contactless card 1305 or contact interfaces with random or structured information attempting to overload or force an unintended response from one or more applets 1311 of the contactless card 1305. In some examples, the counter 1313 may be adjusted, including but not limited to increment or decrement in a non-monotonic sequence. In other examples, the counter 1313 may be adjusted, including but limited to increment or decrement in a monotonic sequence. In some examples, the counter 1313 may be adjusted, including but not limited to increment or decrement in a randomly generated or non-sequential sequence.

In other examples, an attack may be detected when an attacker attempts to impersonate a message, for example by either intercepting a message and attempting to modify the message, or by creating its own artificial message. These may be detected with, such as, message replay with a previously used counter, such as the last counter stored on the one or more servers 1320; message replay with a changed counter; message replay with a changed account number and/or user identification; and/or a message with an altered or constructed cryptogram.

In some examples, responsive to when the contactless card 1305 detects one or more of the attacks, the one or more applets 1311 may be configured to perform one or more actions. For example, the one or more applets 1311 of contactless card 1305 may be configured to transition to a state to where it does not function at all. In another example, the one or more applets 1311 of contactless card 1305 may be configured to signal to the one or more servers 1320 what attack has occurred, for example, if a fuzzing attack was detected, then an encrypted value indicative of the fuzzing attack may be sent to the one or more servers 1320 so as to signal the one or more servers 1320 that the contactless card 1305 may be compromised.

In some examples, a single gesture or plurality of gestures of the contactless card 1305 may be utilized as part of one or more synchronization processes. For example, a first process may include the client device 1305 configured to perform the one or more reads of the one or more applets 1311 during a single gesture by the contactless card 1305 within a data communication field of the client device 1310. Moreover, the one or more servers 1320 may be configured to receive the one or more reads from the client device 1310 based on the single gesture so as to resynchronize the counter 1313. In some examples, the single gesture may comprise a wave, tap, swipe, or any combination thereof by the contactless card 1305 to the client device 1310. In some examples, the first process may include a first window configured to determine if an increment of the counter 1313 of the contactless card 1305 belongs to a first monotonic or non-monotonic sequence. For example, if the increment of the counter 1313 of the contactless card 1305 does not belong to the first monotonic sequence within the first window, the contactless card 1305 may be prompted for one or more additional gestures. The one or more additional gestures may comprise a wave, tap, swipe, or any combination thereof by the contactless card 1305 to the client device 1310. If the counter 1313 is within a second window including a second monotonic or non-monotonic sequence, the counter 1313, responsive to the one or more additional gestures, may be resynchronized. If the counter 1313 falls outside a second window, the contactless card 1305, responsive to the one or more additional gestures, may be deactivated.

In other examples, a second process may include the client device 1305 configured to perform the one or more reads of the one or more applets 1311 during two or more gestures by the contactless card 1305 within a data communication field of the client device 1310. Moreover, the one or more servers 1320 may be configured to receive the one or more reads from the client device 1310 based on the two or more gestures so as to resynchronize the counter 1313. In some examples, the two or more gestures may comprise a wave, tap, swipe, or any combination thereof by the contactless card 1305 to the client device 1310. In some examples, the second process may include a first window configured to determine if an increment of the counter 1313 of the contactless card 1305 belongs to a first monotonic or non-monotonic sequence. For example, if the increment of the counter 1305 of the contactless card 1310 does not belong to the first monotonic sequence within the first window, the contactless card 1305 may be prompted for one or more additional gestures. The one or more additional gestures may comprise a wave, tap, swipe, or any combination thereof by the contactless card 1305 to the client device 1310. If the counter 1313 is within a second window including a second monotonic or non-monotonic sequence, the counter 1313, responsive to the one or more additional gestures, may be resynchronized. If the counter 1313 falls outside a second window, the contactless card 1305, responsive to the one or more additional gestures, may be deactivated.

Continuing with the example above, given that a monotonic increment is utilized, the next value should be 102. As a consequence, to the extent there is an ambiguity in the counter sequence, for example, 1, 1, 2, 1), the contactless card 1305 may be gestured one or more additional times to determine where precisely the counter 1313 is in the sequence for resynchronization. In some examples, there may be a plurality of windows for attempts. Accordingly, the plurality of windows may be adjusted, such as an expansion of one or more windows, a reduction of one or more windows, or a combination thereof. If the next number of the counter 1313 is presented on the next read and also within one of the windows, then the one or more servers 1320 may be configured to authenticate rather than deactivate the contactless card 1305.

Figure 14:
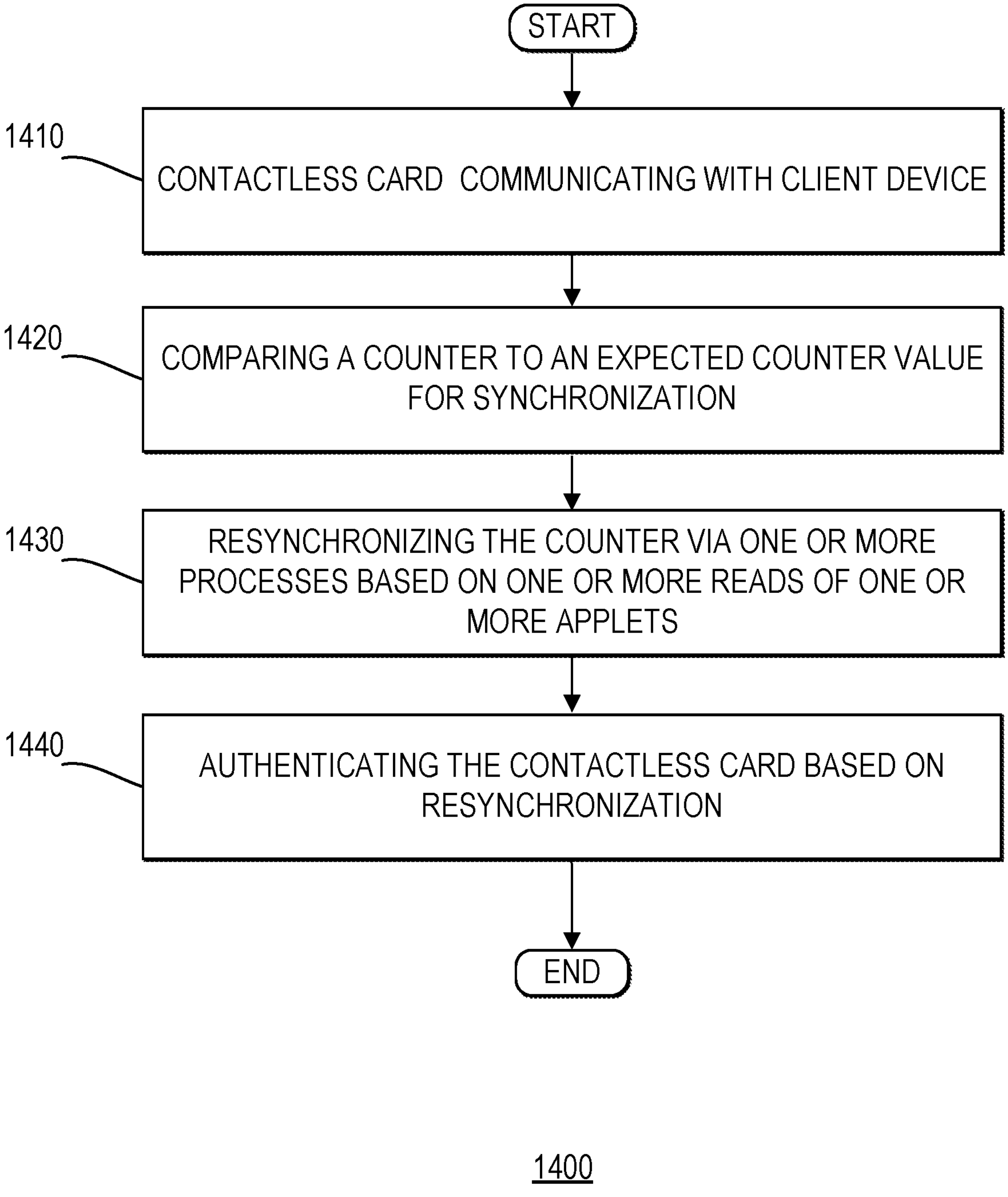
FIG. 14 is a flowchart illustrating a method for resynchronizing a counter in a contactless card according to an example embodiment.

FIG. 14 illustrates a method 1400 for resynchronizing a counter in a contactless card. Method 1400 may reference same or similar components as described above with respect to FIG. 13.

At block 1410, the method may include communicating by a contactless card to a client device. The client device may be in communication with one or more servers. The contactless card may include one or more processors and memory. The memory may comprise one or more applets and a counter. The counter may be configured to signal one or more attacks, including but not limited to nefarious activities such as unauthorized use, excessive use, card tampering, card communication interference, or any combination thereof. In some examples, one or more attacks may be associated with physical access to the contactless card. By way of example, these attacks may include attempted extraction of master keys for a secure element of the contactless card; side channel attacks through other communication pathways, such as the EMV chip contact interface; and/or fuzzing of the contactless card or contact interfaces with random or structured information attempting to overload or force an unintended response from one or more applets of the contactless card.

In other examples, an attack may be detected when an attacker attempts to impersonate a message, for example by either intercepting a message and attempting to modify the message, or by creating its own artificial message. These may be detected with, such as, message replay with a previously used counter, such as the last counter stored on the one or more servers; message replay with a changed counter; message replay with a changed account number and/or user identification; and/or a message with an altered or constructed cryptogram.

In some examples, responsive to when the contactless card detects one or more of the attacks, the one or more applets may be configured to perform one or more actions. For example, the one or more applets of contactless card may be configured to transition to a state to where it does not function at all. In another example, the one or more applets of contactless card may be configured to signal to the one or more servers what attack has occurred, for example, if a fuzzing attack was detected, then an encrypted value indicative of the fuzzing attack may be sent to the one or more servers so as to signal the one or more servers that the contactless card may be compromised.

In some examples, the counter may be adjusted, including but not limited to increment or decrement in a non-monotonic sequence. In other examples, the counter may be adjusted, including but limited to increment or decrement in a monotonic sequence. In some examples, the counter may be adjusted, including but not limited to increment or decrement in a randomly generated or non-sequential sequence. The client device may include one or more processors and memory.

At block 1420, the method may include comparing, by the one or more servers, the received counter to an expected counter value for synchronization. By way of example, the one or more servers may be seeking a value that they are expecting. In one example, the counter of the contactless card may begin at zero. On the one or more servers, the counter may begin at zero, and increment, for example by 1, such that the next expected counter would be 1. If 1 is the expected counter, and the one or more servers instead determines a different value, such as 10, a determination is made as to whether the different value is within a given window or range. To the extent that the different value is within the window or range, then the counter may be set to 10 and therefore accepted. To the extent that the different value is not within the window or range, say for example 100, this value is clearly not equal to 1, the expected counter value, and one or more messages may be transmitted to the client device. In some examples, the one or more messages may comprise an indication that the contactless card must be gestured one or more times. Responsive to these one or more gestures, the counter value may be 101, and this may be an acceptable number determined by the one or more servers. However, in some examples, upon determination of any other number, the contactless card may be deactivated. In some examples, the contactless card may be shut down by the one or more servers. For example, the one or more servers may halt data communication with the contactless card since the contactless card may be under attack, as previously explained.

At block 1430, the method may include resynchronizing the counter, via one or more processes, based on one or more reads of the one or more applets. In some examples, a single gesture or plurality of gestures of the contactless card may be utilized as part of one or more synchronization processes. For example, a first process may include the client device configured to perform the one or more reads of the one or more applets during a single gesture by the contactless card within a data communication field of the client device. Moreover, the one or more servers may be configured to receive the one or more reads from the client device based on the single gesture so as to resynchronize the counter. In some examples, the single gesture may comprise a wave, tap, swipe, or any combination thereof by the contactless card to the client device. In some examples, the first process may include a first window configured to determine if an increment of the counter of the contactless card belongs to a first monotonic or non-monotonic sequence. For example, if the increment of the counter of the contactless card does not belong to the first monotonic sequence within the first window, the contactless card may be prompted for one or more additional gestures. The one or more additional gestures may comprise a wave, tap, swipe, or any combination thereof by the contactless card to the client device. If the counter is within a second window including a second monotonic or non-monotonic sequence, the counter, responsive to the one or more additional gestures, may be resynchronized. If the counter falls outside a second window, the contactless card, responsive to the one or more additional gestures, may be deactivated.

In other examples, a second process may include the client device configured to perform the one or more reads of the one or more applets during two or more gestures by the contactless card within a data communication field of the client device. Moreover, the one or more servers may be configured to receive the one or more reads from the client device based on the two or more gestures so as to resynchronize the counter. In some examples, the two or more gestures may comprise a wave, tap, swipe, or any combination thereof by the contactless card to the client device. In some examples, the second process may include a first window configured to determine if an increment of the counter of the contactless card belongs to a first monotonic or non-monotonic sequence. For example, if the increment of the counter of the contactless card does not belong to the first monotonic sequence within the first window, the contactless card may be prompted for one or more additional gestures. The one or more additional gestures may comprise a wave, tap, swipe, or any combination thereof by the contactless card to the client device. If the counter is within a second window including a second monotonic or non-monotonic sequence, the counter, responsive to the one or more additional gestures, may be resynchronized. If the counter falls outside a second window, the contactless card, responsive to the one or more additional gestures, may be deactivated.

Continuing with the example above, given that a monotonic increment is utilized, the next value should be 102. As a consequence, to the extent there is an ambiguity in the counter sequence, (for example, 1, 1, 2, 1), the contactless card may be gestured one or more additional times to determine where precisely the counter is in the sequence for resynchronization. In some examples, there may be a plurality of windows for attempts. Some client devices may perform multiple readings of tags every time the tag is read. Accordingly, the plurality of windows may be adjusted, such as an expansion of two or three windows. If the next number of the counter is presented and also within one of the windows, then the one or more servers may be configured to authenticate rather than deactivate the contactless card.

At block 1440, the method may include authenticating, by the one or more servers, the contactless card based on resynchronizing the counter.

In some examples, the present disclosure refers to a tap of the contactless card. However, it is understood that the present disclosure is not limited to a tap, and that the present disclosure includes other gestures (e.g., a wave or other movement of the card).

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:

receiving, by a server comprising a processor and a memory, a counter;

determining, by the server, whether the counter is within a first window; and after determining that an adjustment of the counter is within the first window, resynchronizing, by the server, the counter.

2. The method of claim 1, wherein the first window comprises a sequence of counter values.

3. The method of claim 2, wherein the sequence of counter values is a monotonic sequence.

4. The method of claim 2, wherein the sequence of counter values is a non-monotonic sequence.

5. The method of claim 2, wherein determining that the counter is within the first window comprises determining that an adjustment of the counter belongs to the sequence of counter values.

6. The method of claim 5, wherein the adjustment of the counter is performed by a contactless card prior to receipt of the counter by the server.

7. The method of claim 1, further comprising:

determining, by the server, that the counter is not within a first window;

determining, by the server, whether the counter is within a second window; and after determining that the counter is within the second window, resynchronizing, by the server, the counter.

8. The method of claim 7, further comprising, after determining that the counter is not within the second window, deactivating, by the server, a contactless card associated with the counter.

9. The method of claim 7, wherein:

the server receives the counter via a first read of a contactless card by a receiving device after a first entry of the contactless card into a communication field, and the receiving device is in data communication with the server.

10. The method of claim 9, wherein the determination whether the counter is within the second window is performed after receipt by the server of the counter after a second read of the contactless card by the receiving device after a second entry of the contactless card into the communication field.

11. A server, comprising:

a processor; and a memory, wherein the server:

receive, from a contactless card via a receiving device, a counter, determines, whether the counter is within a first window, and after determining that an adjustment of the counter is within the first window, resynchronizes, the counter.

12. The server of claim 11, wherein the first window comprises a sequence of counter values.

13. The server of claim 12, wherein determining that the counter is within the first window comprises determining that an adjustment of the counter belongs to the sequence of counter values.

14. The server of claim 13, wherein the sequence comprises at least one selected from the group of a monotonic sequence and a non-monotonic sequence.

15. The server of claim 13, wherein the adjustment of the counter is performed by a contactless card prior to receipt of the counter by the server.

16. The server of claim 14, wherein the adjustment comprises at least one selected from the group of an increment of the counter and a decrement of the counter.

17. A system, comprising:

a contactless card comprising a card processor and a card memory, the card memory containing a counter; and a server comprising a server processor and a server memory, wherein the server is configured to:

receive, from the contactless card via a receiving device, the counter, determine, whether the counter is within a first window, and after determining that an adjustment of the counter is within the first window, resynchronize, the counter.

18. The system of claim 17, wherein the server:

determines that the counter is not within the first window;

determines whether the counter is within a second window; and after determining that the counter is within the second window, resynchronizes the counter.

19. The system of claim 18, wherein:

prior to determining whether the counter is within the first window, the server receives the counter via a first read of the contactless card by the receiving device after a first entry of the contactless card into a communication field, and the receiving device is in data communication with the server.

20. The system of claim 19, wherein, prior to the determination whether the counter is within the second window, the server receives the counter after a second read of the contactless card by the receiving device after a second entry of the contactless card into the communication field.

* * * * *